US012663813B2

(12) United States Patent (10) Patent No.: US 12,663,813 B2
Chen (45) Date of Patent: Jun. 23, 2026

(54) INFORMATION PROCESSING APPARATUS, INFORMATION PROCESSING METHOD, AND MOBILE APPARATUS

(71) Applicant: SONY GROUP CORPORATION, Tokyo (JP)

(72) Inventor: Xi Chen, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/834,520

(22) PCT Filed: Dec. 19, 2022

(86) PCT No.: PCT/JP2022/046624
§ 371 (c)(1),
(2) Date: Jul. 30, 2024

(87) PCT Pub. No.: WO2023/153083
PCT Pub. Date: Aug. 17, 2023

(65) Prior Publication Data
US 2025/0172950 A1 May 29, 2025

(30) Foreign Application Priority Data
Feb. 8, 2022 (JP) ................................. 2022-017816

(51) Int. Cl.
*G05D 1/686* (2024.01)
(52) U.S. Cl.
CPC .................................. *G05D 1/686* (2024.01)

(58) Field of Classification Search
CPC ...................................................... G05D 1/686
See application file for complete search history.

(56) References Cited

U.S. PATENT DOCUMENTS

| 2018/0181137 A1* | 6/2018 | Choi ....................... | G06V 20/10 |
|---|---|---|---|
| 2019/0064838 A1* | 2/2019 | Kuno ................... | G06V 40/103 |
| 2019/0294171 A1* | 9/2019 | Maeda ................ | G05D 1/0231 |
| 2022/0026930 A1* | 1/2022 | Mell ........................ | G05D 1/12 |

(Continued)

FOREIGN PATENT DOCUMENTS

| JP | 2008-234404 A | 10/2008 |
|---|---|---|
| WO | 2019/069626 A1 | 4/2019 |

(Continued)

OTHER PUBLICATIONS

Tomo, Convoy Driving, https://notomotor.com/tomo/guides/convoy#:~:text=If%20you%20get%20stopped%20at,that%20vehicle%20and%20the%20Leader. (Year: 2025).*

(Continued)

*Primary Examiner* — Jelani A Smith
*Assistant Examiner* — Gabriel Anfinrud
(74) *Attorney, Agent, or Firm* — CHIP LAW GROUP

(57) ABSTRACT

There is provided an information processing apparatus that includes an orientation determination unit that determines an orientation of an object to be followed, and a path generation unit that determines an orientation of a path end point on the basis of the orientation of the object to be followed, the path end point being an end point of a path for a mobile apparatus to follow the object to be followed, and generates the path.

12 Claims, 12 Drawing Sheets

(56)     References Cited

U.S. PATENT DOCUMENTS

2023/0185317 A1*   6/2023  Horiuchi .............. G05D 1/0246
                                                          700/245
2023/0400863 A1*  12/2023  Chen ...................... G05D 1/686

FOREIGN PATENT DOCUMENTS

WO       2021/246169  A1    12/2021
WO       2021/246170  A1    12/2021

OTHER PUBLICATIONS

Algabri, Target Recovery for Robust Deep Learning-Based Person
Following in Mobile Robots: Online Trajectory Prediction, 2021
(Year: 2021).*
International Search Report and Written Opinion of PCT Applica-
tion No. PCT/JP2022/046624, issued on Feb. 21, 2023, 09 pages of
ISRWO.

* cited by examiner

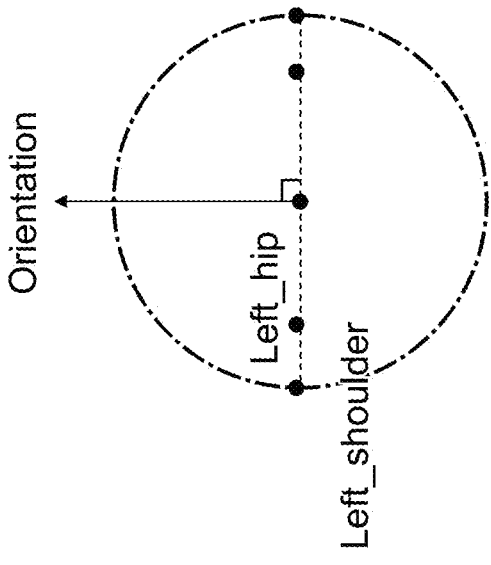
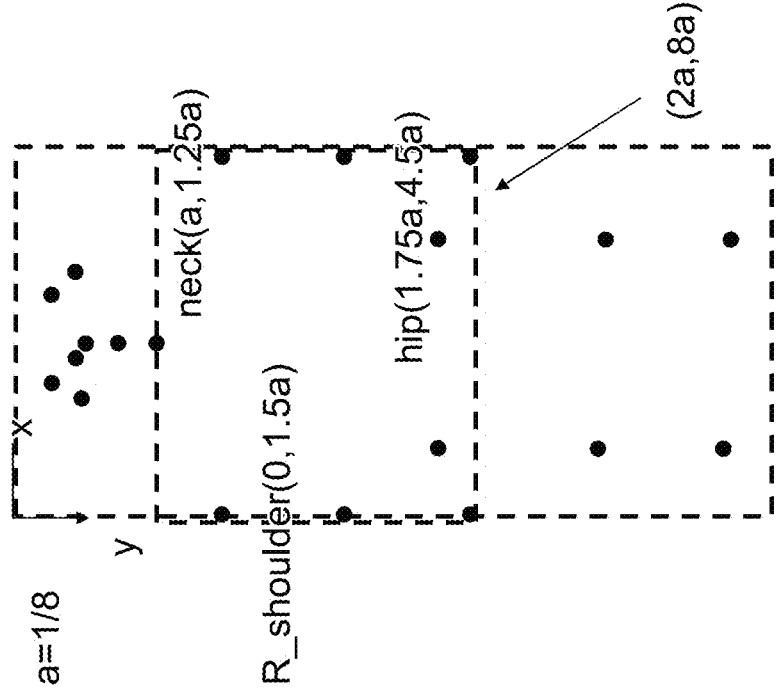
FIG.5

Information of object
to be followed
· Orientation
· Position (prediction)
· Time of losing Self-position,
moving speed
and direction,
posture, etc.

START

S201

Generate Bezier curve

S202

Divide curved path

S203

Calculate orientation of end
point of sub-curved path

S204

Time of
losing

Generate path including sub-curved paths

Path for control

END

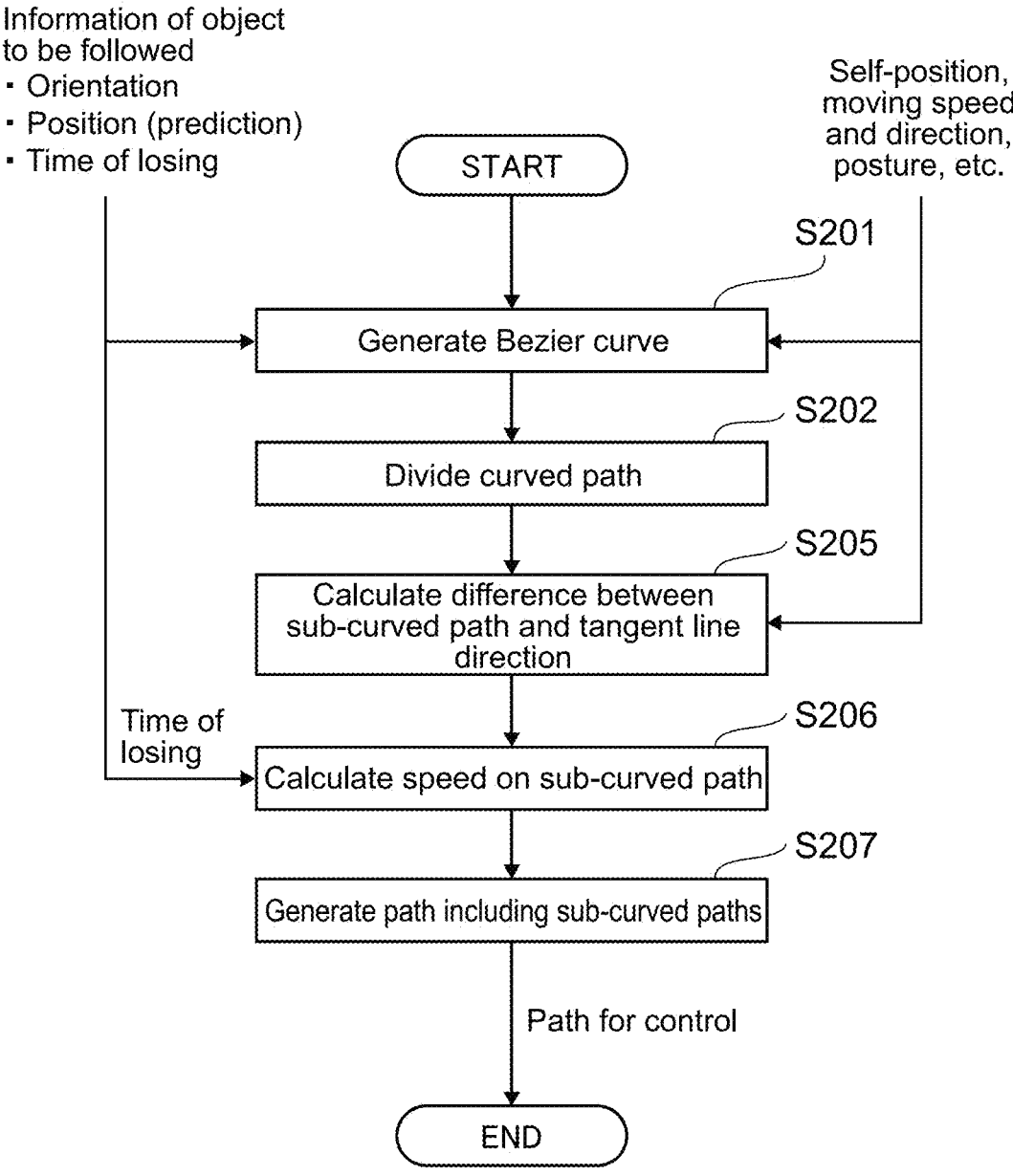

Information of object
to be followed
· Orientation
· Position (prediction)
· Time of losing Self-position,
moving speed
and direction,
posture, etc.

START

S201

Generate Bezier curve

S202

Divide curved path

S205

Calculate difference between
sub-curved path and tangent line
direction

Time of
losing

S206

Calculate speed on sub-curved path

S207

Generate path including sub-curved paths

Path for control

END

FIG.9

INFORMATION PROCESSING APPARATUS, INFORMATION PROCESSING METHOD, AND MOBILE APPARATUS

CROSS REFERENCE TO RELATED APPLICATIONS

This application is a U.S. National Phase of International Patent Application No. PCT/JP2022/046624 filed on Dec. 19, 2022, which claims priority benefit of Japanese Patent Application No. JP 2022-017816 filed in the Japan Patent Office on Feb. 8, 2022. Each of the above-referenced applications is hereby incorporated herein by reference in its entirety.

TECHNICAL FIELD

The present disclosure relates to a mobile apparatus that follows an object to be followed, and to an information processing apparatus, an information processing method, and an information processing program that control the mobile apparatus.

BACKGROUND ART

A mobile apparatus that follows a moving object to be followed is known. According to Patent Literature 1, the orientation of a mobile robot and the orientation of an object to be followed (typically, person; paragraph 0021) are matched with each other (paragraph 0033), and a relative position relationship between the mobile robot and the object to be followed is maintained, so that a natural following operation is achieved without performing unnecessary roundabout movement or turning operation (paragraph 0026).

CITATION LIST

Patent Literature

Patent Literature 1: Japanese Patent Application Laid-open No. 2008-234404

DISCLOSURE OF INVENTION

Technical Problem

For example, when the object to be followed turns a corner, if the mobile apparatus makes a path for the object to be followed so as to capture the object to be followed at the center of the field of view, there is a possibility that the mobile apparatus loses the object to be followed, gets stuck, collides with the corner, or eventually fails to follow the object to be followed, for example.

In view of the circumstances as described above, it is desirable that the mobile apparatus suitably continues to follow an object to be followed.

Solution to Problem

An information processing apparatus according to one embodiment of the present disclosure includes: an orientation determination unit that determines an orientation of an object to be followed; and a path generation unit that determines an orientation of a path end point on the basis of the orientation of the object to be followed, the path end point being an end point of a path for a mobile apparatus to follow the object to be followed, and generates the path.

According to this embodiment, the mobile apparatus generates the path of the mobile apparatus on the basis of the orientation of the object to be followed (that is, a direction in which the object to be followed is going to move), instead of the direction in which the object to be followed is currently moving. This makes it possible for the mobile apparatus to continue to follow the object to be followed without losing it by continuing to capture the object to be followed in the range of the field of view and also rediscover the object to be followed quickly if the mobile apparatus loses the object to be followed.

The path generation unit may determine the orientation of the path end point such that the orientation of the path end point matches the orientation of the object to be followed.

According to this embodiment, the mobile apparatus can generate a path on which the object to be followed is not lost (the object to be followed continues to be included in the field of view), instead of the path for tracing the movement path of the object to be followed.

The path generation unit may generate a curved path as the path when a difference between a moving direction of the mobile apparatus and the orientation of the object to be followed is larger than a threshold.

According to this embodiment, even if the object to be followed moves substantially linearly, the mobile apparatus can continue to follow the object to be followed in a large arc so as to continue to capture the mobile apparatus in the field of view without tracing the movement path.

The information processing apparatus may further include a position estimation unit that determines an estimated position of the object to be followed, and the path generation unit may determine a position of the path end point on the basis of the estimated position.

According to this embodiment, since the position of the path end point is determined at the estimated position, a path on which the object to be followed is not lost (the object to be followed continues to be included in the field of view) can be generated.

The position estimation unit may detect the object to be followed from an image captured by the mobile apparatus, and the path generation unit may determine a speed of the mobile apparatus on the basis of a detection result of the object to be followed.

The path generation unit may increase the speed of the mobile apparatus in accordance with a time length during which the object to be followed is lost.

Accordingly, as the time length during which the object to be followed is lost becomes longer, the speed of the mobile apparatus increases, so that the mobile apparatus can quickly rediscover the object to be followed.

The path generation unit may generate a Bezier curve leading to the path end point, divide the Bezier curve by a plurality of division points, generate a plurality of sub-curved paths each including two division points adjacent to each other, and generate, as the path, a path including the plurality of sub-curved paths.

The Bezier curve is a curve that connects a start point and an end point, and is determined on the basis of the position and orientation of the start point and the position and orientation of the end point. Generating the path using the Bezier curve makes it possible to set the orientation of the path end point as the orientation of the object to be followed.

When an orientation and the moving direction of the mobile apparatus are not linked to each other, the path generation unit may generate the plurality of sub-curved paths such that an orientation of an end point of each sub-curved path matches an orientation of a straight line connecting the end point of the sub-curved path and the estimated position.

Accordingly, the mobile apparatus moves in a manner similar to lateral motion (crab walking) while focusing on the object to be followed, so that the mobile apparatus is less likely to lose the object to be followed, and the continuity of the follow can be improved.

When the orientation and the moving direction of the mobile apparatus are linked to each other, the path generation unit may determine the Bezier curve as the path.

Setting the Bezier curve as the path makes it possible to set the orientation of the path end point as the orientation of the object to be followed.

The path generation unit may determine the speed of the mobile apparatus that moves on the plurality of sub-curved paths on the basis of a difference between an orientation of an end point of each sub-curved path and an orientation of a tangent line of the end point.

Accordingly, if the difference between the orientation of the mobile apparatus and the orientation of the object to be followed becomes larger, the mobile apparatus is more likely to lose the object to be followed. According to this embodiment, the mobile apparatus determines the speed of the mobile apparatus on the basis of the ease of losing the object to be followed, so that the mobile apparatus can continue to capture the object to be followed in the range of the field of view, the object to be followed is less likely to be lost, and the continuity of the follow can be improved.

The path generation unit may determine the speed of the mobile apparatus such that the speed of the mobile apparatus moving on the plurality of sub-curved paths increases as the difference between the orientation of the end point of each sub-curved path and the orientation of the tangent line of the end point becomes larger.

For example, when the object to be followed is located in the vicinity of the front of a corner, the difference in the orientation becomes larger. According to this embodiment, it is possible to increase the speed on a sub-curved path leading to the corner. Thus, the mobile apparatus can go to the vicinity of the corner quickly and perform a turning motion, so that the mobile apparatus can continue to capture the object to be followed in the range of the field of view, the object to be followed is less likely to be lost, and the continuity of the follow can be improved.

The orientation determination unit may determine the orientation of the object to be followed on the basis of an image captured by the mobile apparatus.

For example, the orientation determination unit can determine the orientation of the object to be followed on the basis of the bone of the object to be followed calculated from an image.

An information processing method according to one embodiment of the present disclosure includes: determining an orientation of an object to be followed; and determining an orientation of a path end point on the basis of the orientation of the object to be followed, the path end point being an end point of a path for a mobile apparatus to follow the object to be followed, and generating the path.

An information processing program according to one embodiment of the present disclosure causes an information processing apparatus to operate as: an orientation determination unit that determines an orientation of an object to be followed; and a path generation unit that determines an orientation of a path end point on the basis of the orientation of the object to be followed, the path end point being an end point of a path for a mobile apparatus to follow the object to be followed, and generates the path.

A mobile apparatus according to one embodiment of the present disclosure includes: a moving mechanism; an orientation determination unit that determines an orientation of an object to be followed; a path generation unit that determines an orientation of a path end point on the basis of the orientation of the object to be followed, the path end point being an end point of a path for following the object to be followed, and generates the path; and a following control unit that controls the moving mechanism to move on the path.

BRIEF DESCRIPTION OF DRAWINGS

FIG. 5 shows a method of calculating a bone.

FIG. 9 shows a flow of a method of generating a curved path when the orientation and the moving direction of the mobile apparatus are linked to each other.

MODE(S) FOR CARRYING OUT THE INVENTION

Hereinafter, an embodiment of the present disclosure will be described with reference to the drawings.

1. General Outline of This Embodiment

Figure 1:
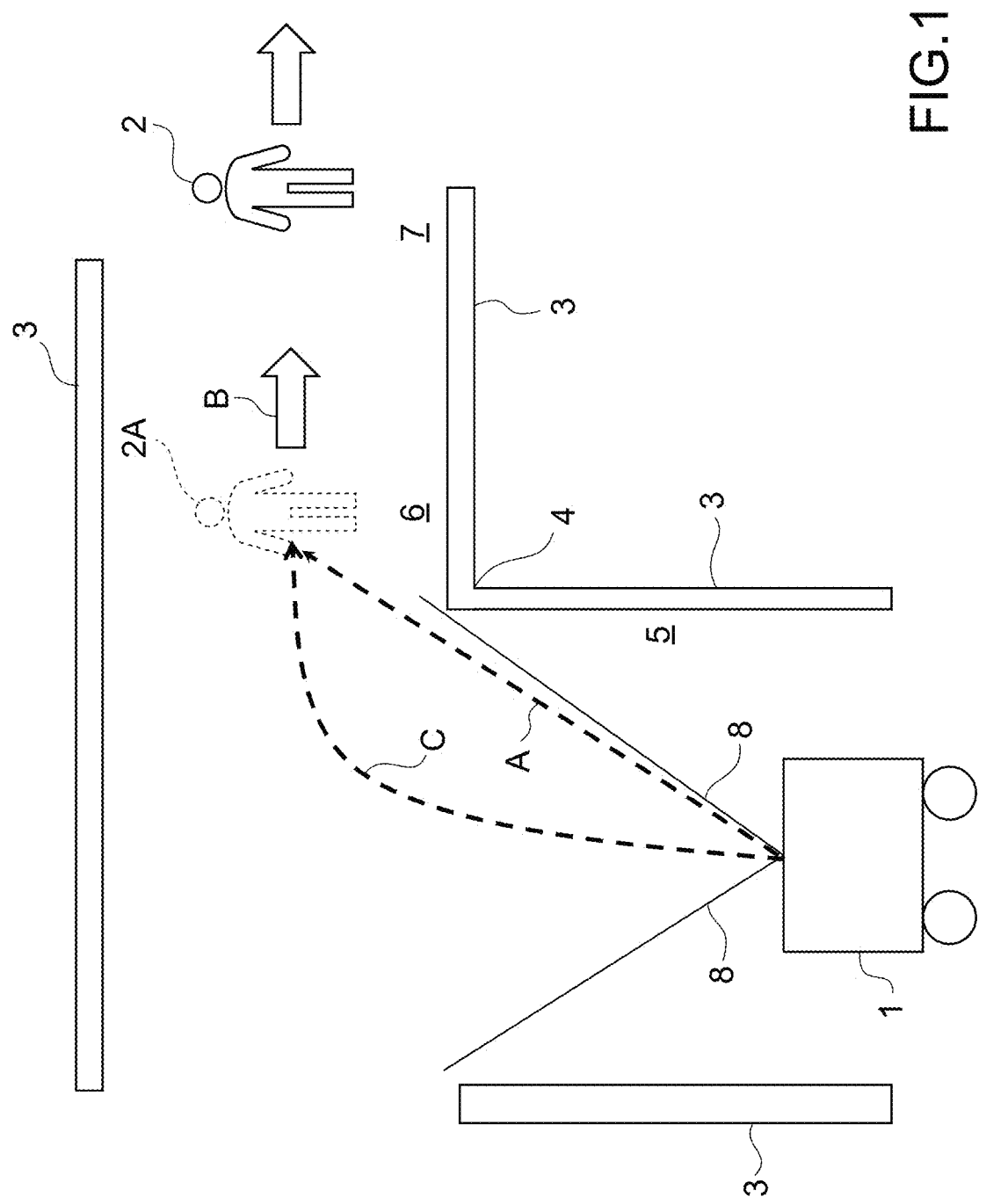
FIG. 1 schematically shows the general outline of this embodiment.

FIG. 1 schematically shows the general outline of this embodiment.

A mobile apparatus 1 according to one embodiment of the present disclosure follows a moving object to be followed 2. The mobile apparatus 1 is an automated driving vehicle, an automated guided vehicle (AGV), a robot, a pet-type quadrupedal robot, a drone, or the like.

The object to be followed 2 is a person, an animal, a vehicle, an AGV, a robot, a pet-type quadrupedal robot, a drone, or the like. The object to be followed 2 may be any object as long as it moves while changing the orientation (typically, it moves in a state of facing the moving direction). The object to be followed 2 may be a living substance or may not be a living substance. In this embodiment, an example in which the object to be followed 2 is a person (pedestrian) will be described.

For example, an environment where the object to be followed 2 moves includes a wall 3, and the wall 3 forms a corner 4 that is a corner having a right angle (90 degrees) in the rightward direction. The object to be followed 2 starts moving (walking) from a front 5 of the corner 4 and moves to a back 6 of the corner 4. Since the object to be followed 2 is a person, the person can move from the front 5 to the back 6 substantially linearly through a location close to the corner 4 without turning the corner 4 at a right angle (arrow A). After that, the object to be followed 2 further moves from the back 6 of the corner 4 to a right 7 (arrow B).

The mobile apparatus 1 follows the object to be followed 2 moving in such a manner. Specifically, the mobile apparatus 1 determines an estimated position 2A of the object to be followed 2, generates a path toward the estimated position 2A, and moves on the generated path. If the mobile apparatus 1 moves so as to trace the moving path (arrow A) of the object to be followed 2, there is a possibility that the mobile apparatus 1 collides with the corner 4 or that the mobile apparatus 1 fails to capture the object to be followed 2 occluded (hidden) by the corner 4 in a field of view 8 due to deceleration in the vicinity of the corner 4 and then loses (misses) the object to be followed 2, for example. As a result of the fact that the mobile apparatus 1 loses the object to be followed 2 in front of the corner 4, there is a possibility that the mobile apparatus 1 eventually fails to follow the object to be followed 2 further moving from the back 6 to the right 7 (arrow B).

In view of the circumstances as described above, in this embodiment, the mobile apparatus 1 continues to capture the object to be followed 2 in the range of the field of view and thus continues to follow the object to be followed 2 without losing it. Further, the mobile apparatus 1 quickly rediscovers the object to be followed 2 even if the mobile apparatus 1 loses the object to be followed 2. In other words, in this embodiment, the mobile apparatus 1 generates not a path for tracing the moving path of the object to be followed 2 (arrow A) but a path on which the object to be followed 2 is not lost (the object to be followed 2 continues to be included in the field of view) (arrow C). In this example, even if the object to be followed 2 moves from the front 5 to the back 6 substantially linearly through a location close to the corner 4 (arrow A), the mobile apparatus 1 continues to follow the object to be followed 2 in a large arc (arrow C) so as to continue to capture the mobile apparatus 1 in the field of view without tracing the moving path (arrow A). In order to achieve that, the mobile apparatus 1 generates the path of the mobile apparatus 1 (arrow C) on the basis of the orientation of the object to be followed 2 (that is, the direction in which the object to be followed 2 is going to move), instead of the direction in which the object to be followed 2 is currently moving.

2. Configuration of Mobile Apparatus

Figure 2:
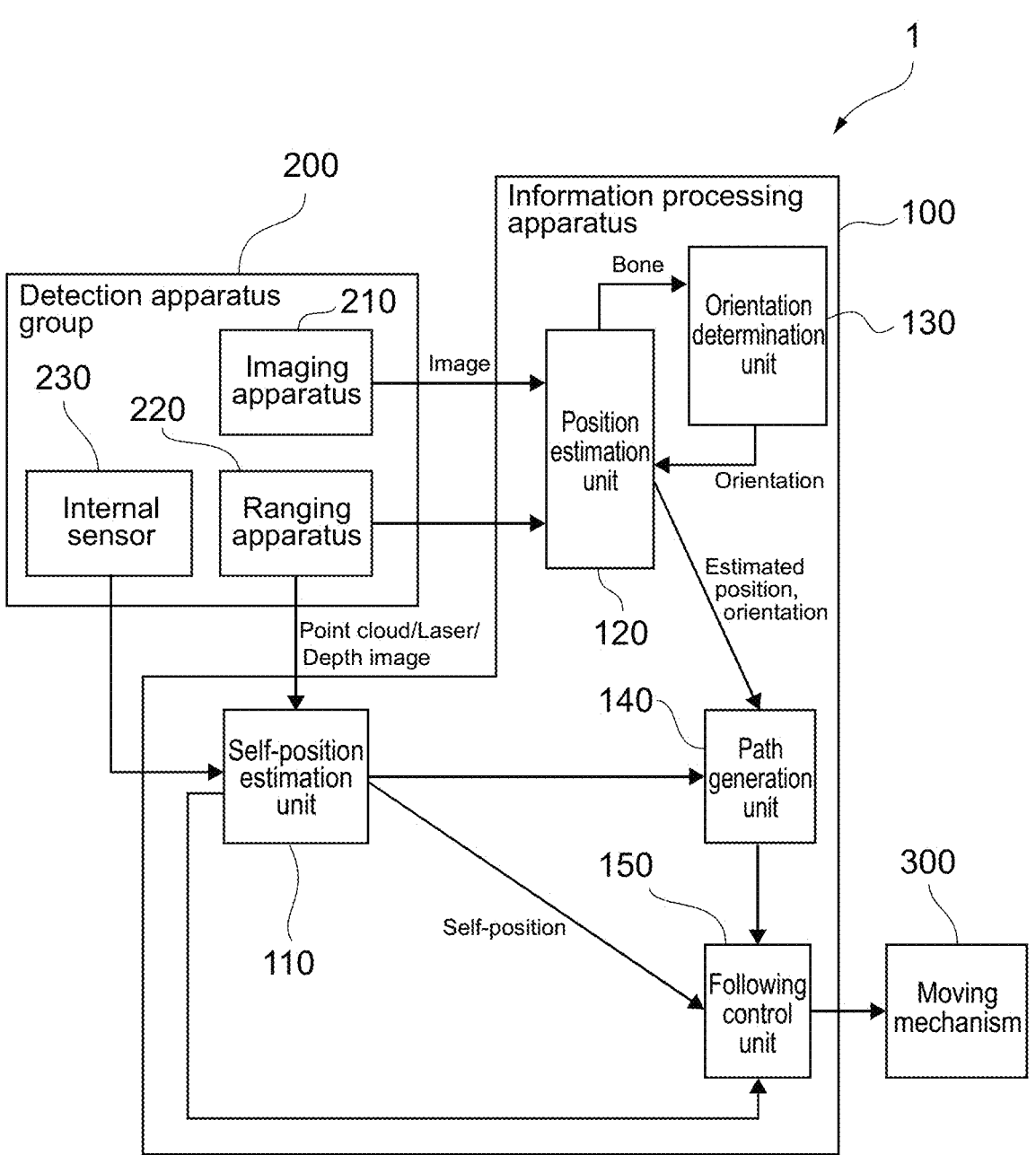
FIG. 2 shows a configuration of a mobile apparatus.

FIG. 2 shows a configuration of the mobile apparatus.

The mobile apparatus 1 includes an information processing apparatus 100, a detection apparatus group 200, and a moving mechanism 300.

The information processing apparatus 100 operates as a self-position estimation unit 110, a position estimation unit 120, an orientation determination unit 130, a path generation unit 140, and a following control unit 150 when a central processing unit (CPU) loads an information processing program recorded on a read-only memory (ROM) to a random-access memory (RAM) and executes the program.

The detection apparatus group 200 includes an imaging apparatus 210 and a ranging apparatus 220 that are external sensors, and an internal sensor 230.

The imaging apparatus 210 is, for example, an RGB camera including an image sensor, and images an environment to generate an image.

The ranging apparatus 220 has the directivity and acquires external data used for estimating the position and orientation of the mobile apparatus 1. Specifically, the ranging apparatus 220 measures a distance on the basis of a signal received from the environment and acquires distance data. More specifically, the ranging apparatus 220 is a sensor (active sensor) of a type of outputting a signal of an electromagnetic wave, light, sound, or the like to the environment and receiving a reflected wave. For example, the ranging apparatus 220 is a time-of-flight (ToF) sensor, LiDAR, a millimeter-wave radar, and/or an ultrasonic sonar. For example, the ranging apparatus 220 generates ranging data such as point cloud, Laser, and/or a depth image.

The internal sensor 230 acquires internal data used for estimating the position and orientation of the mobile apparatus 1. Specifically, the internal sensor 230 acquires data such as an angular velocity, an acceleration, and/or a rotational angle of the motor of the mobile apparatus 1. The internal sensor 230 is, for example, an inertial measurement unit (IMU) and/or a rotational angle encoder.

The moving mechanism 300 includes a plurality of tires or a plurality of legs, an actuator that drives those tires or legs, and the like and automatedly moves in the environment.

The mobile apparatus 1 may be an apparatus that moves such that the orientation and the moving direction of the mobile apparatus 1 are linked to each other, for example, as in a two-wheel-drive vehicle. Alternatively, the mobile apparatus 1 may be an apparatus that moves such that the orientation and the moving direction of the mobile apparatus 1 are not linked to each other, for example, as in a camera platform or a mecanum wheel. In addition, the mobile apparatus 1 may selectively implement both the movement in which the orientation and the moving direction of the mobile apparatus 1 are linked to each other and the movement in which they are not linked to each other.

3. Operation Flow of Mobile Apparatus

Figure 3:
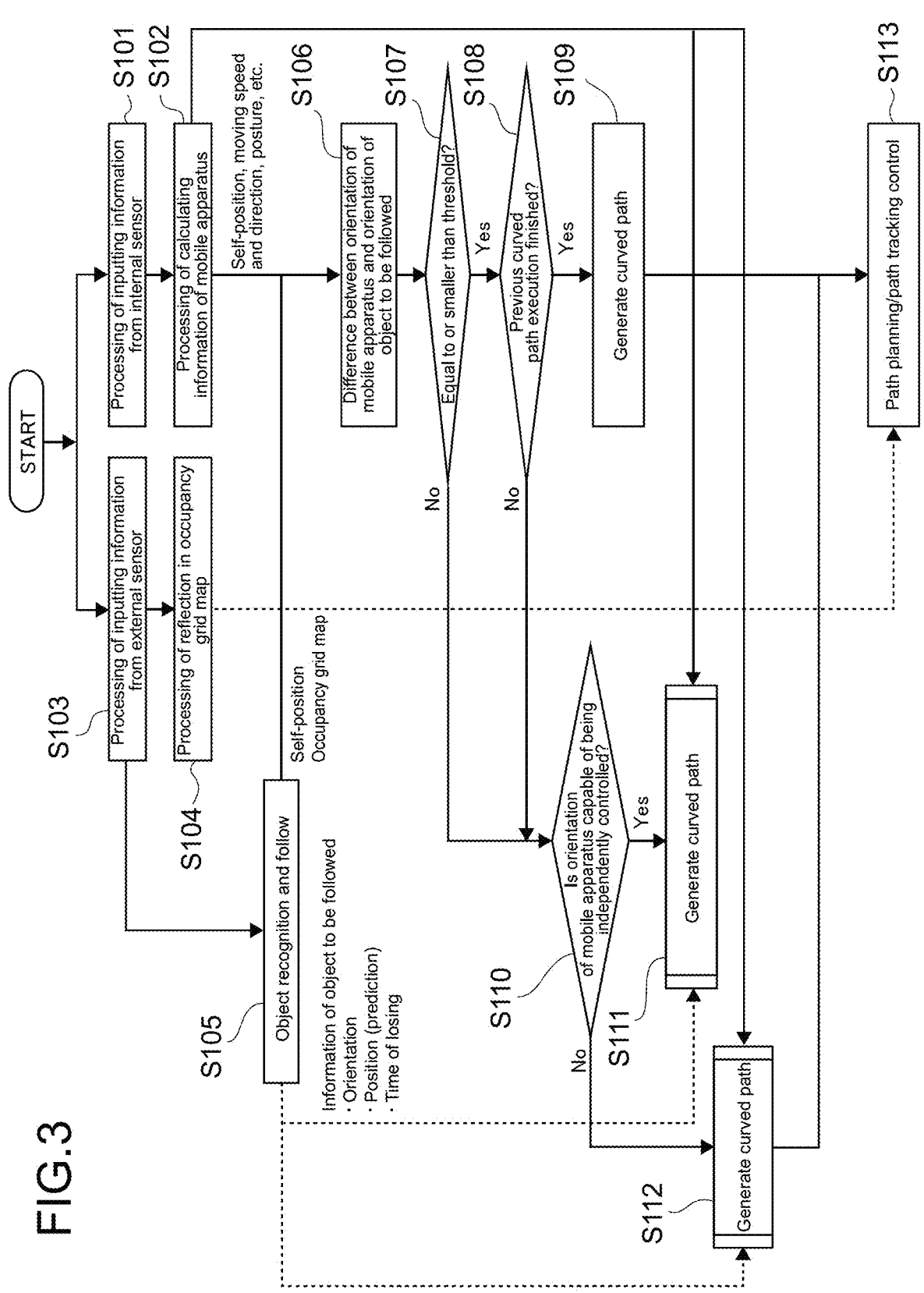
FIG. 3 shows an operation flow of the mobile apparatus.

FIG. 3 shows an operation flow of the mobile apparatus.

The self-position estimation unit 110 acquires internal data such as an angular velocity, an acceleration, and/or a rotational angle of the motor of the mobile apparatus 1 from the internal sensor 230 (Step S101). The self-position estimation unit 110 estimates a self-position, a moving speed, a moving direction, an orientation (posture), and the like of the mobile apparatus 1 on the basis of the internal data (Step S102).

The self-position estimation unit 110 acquires an image captured by the imaging apparatus 210 that is the external sensor. The self-position estimation unit 110 acquires ranging data such as point cloud, Laser, and/or a depth image generated by the ranging apparatus 220 that is the external sensor (Step S103).

The self-position estimation unit 110 generates a three-dimensional environment map on the basis of the image acquired by the imaging apparatus 210 and the ranging data generated by the ranging apparatus 220 and reflects the self-position in the environment map (Step S104). The environment map is, for example, an occupancy grid map (occupancy map). The occupancy grid map represents a space distribution of objects present in the environment by using a three-dimensional positional relationship in which a plurality of voxels (cubes) is stacked, and represents a probability (occupancy probability) of the presence of objects in each voxel by using a color tone of each voxel.

The position estimation unit 120 detects the object to be followed 2 from the image acquired by the imaging apparatus 210, determines the estimated position 2A of the object to be followed 2, and counts time during which the object to be followed 2 is lost if the object to be followed 2 is lost (Step S105). The orientation determination unit 130 determines the orientation of the object to be followed 2 on the basis of the image acquired by the imaging apparatus 210 (Step S105). A specific example of the method of determining the estimated position 2A of the object to be followed 2 by the position estimation unit 120 will be described below.

Figure 4:
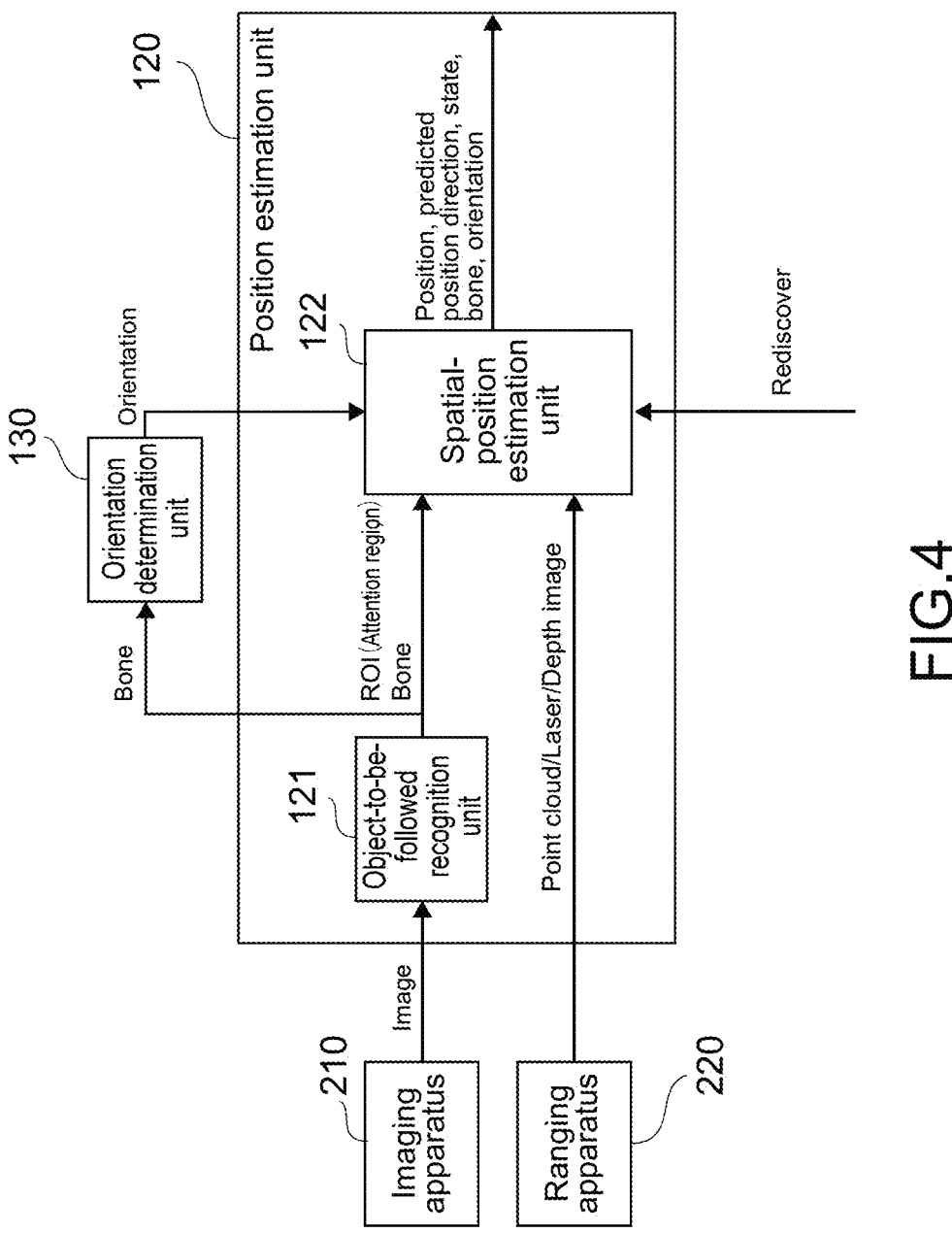
FIG. 4 shows a configuration of a position estimation unit.

FIG. 4 shows a configuration of the position estimation unit.

The position estimation unit 120 includes an object-to-be-followed recognition unit 121 and a spatial-position estimation unit 122. The object-to-be-followed recognition unit 121 detects a region of interest (ROI, attention region) serving as a region including the object to be followed 2 from the image acquired by the imaging apparatus 210, and calculates a bone (coordinates of each joint point) of the object to be followed 2. The orientation determination unit 130 determines the orientation of the object to be followed 2 on the basis of the bone calculated by the object-to-be-followed recognition unit 121. The orientation of the object to be followed 2 means the orientation of a body part such as a shoulder or a hip.

FIG. 5 shows the method of calculating the bone.

The object-to-be-followed recognition unit 121 detects the skeleton of the object to be followed 2 by deep learning, obtains normal vectors of pairs of right and left shoulders and hip joints, calculates a mean value, and detects the orientation of the object to be followed 2.

Figure 6:
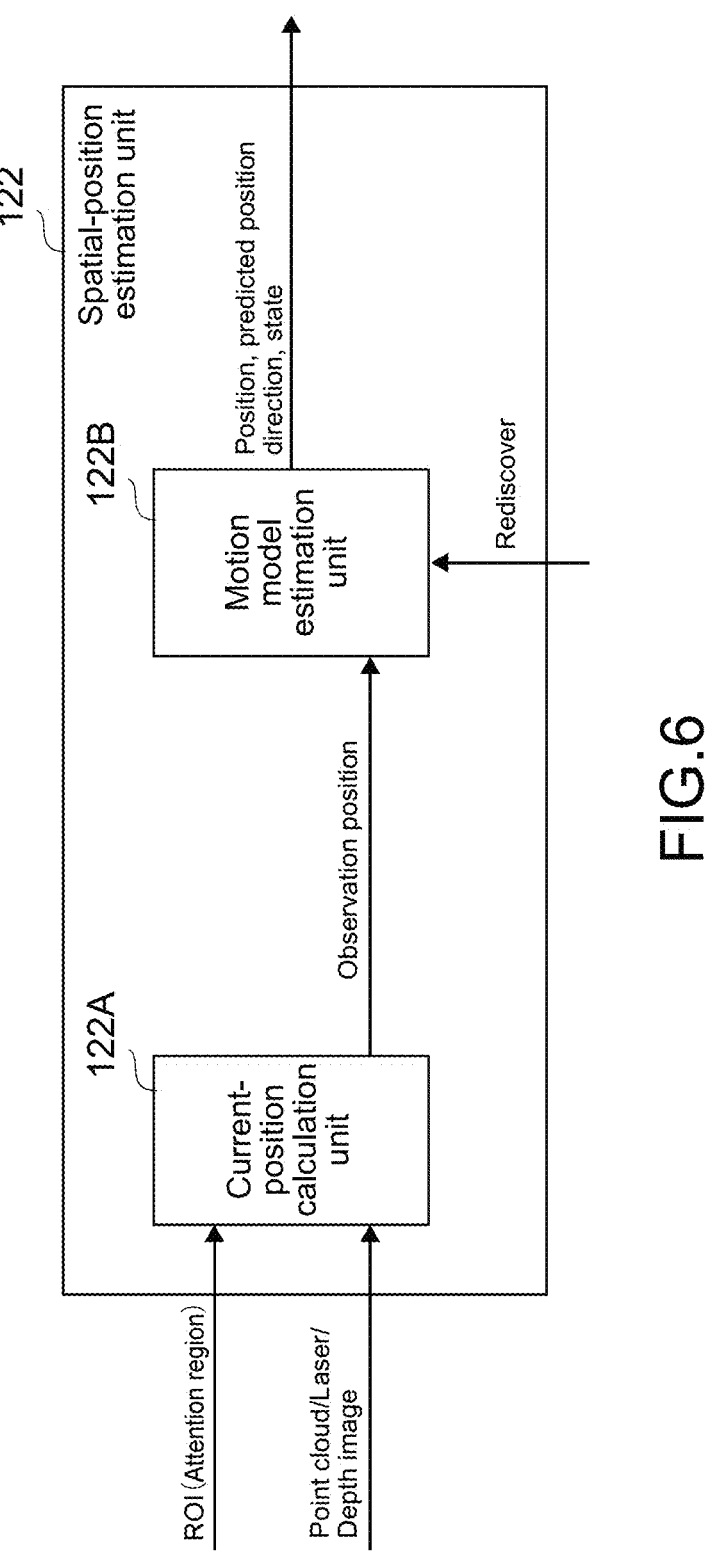
FIG. 6 shows a configuration of spatial-position estimation unit.

FIG. 6 shows a configuration of the spatial-position estimation unit.

The spatial-position estimation unit 122 includes a current-position calculation unit 122A and a motion model estimation unit 122B. The current-position calculation unit 122A or the spatial-position estimation unit 122 calculates an observation position that is a current spatial position (per frame) of the object to be followed 2 by sensor fusion on the basis of the ranging data from the ranging apparatus 220, the ROI and the bone from the object-to-be-followed recognition unit 121, and the orientation of the object to be followed 2 from the orientation determination unit 130. The motion model estimation unit 122B accumulates the observation position per frame from the current-position calculation unit 122A and estimates a motion model on the basis of the accumulated observation positions. The motion model estimation unit 122B calculates a current position, a future predicted position, a direction, and a motion state of the object to be followed 2 by the Particle filter or the Kalman filter.

Now refer back to the flowchart. The path generation unit 140 generates a path for the mobile apparatus 1 to follow the object to be followed 2. The path includes a path start point (the current location of the mobile apparatus 1), a path end point (the target location of the mobile apparatus 1, the estimated position 2A of the object to be followed 2), a straight line or curved line that connects those two points and the end point (the target location of the mobile apparatus 1), and a straight line or curved line that connects those two points. First, the path generation unit 140 calculates a difference between the moving direction of the mobile apparatus 1 (Step S102) and the orientation of the object to be followed 2 (Step S105) (Step S106), and determines whether or not the difference is equal to or smaller than a threshold (Step S107).

The difference equal to or smaller than the threshold means that the moving direction of the mobile apparatus 1 and the orientation of the object to be followed 2 are similar directions. In this case (Step S107, YES), the path generation unit 140 determines whether or not the mobile apparatus 1 has finished moving on the curved path generated at the last minute (Step S108). If the mobile apparatus 1 has finished moving on the curved path generated at the last minute (Step S108, YES), the path generation unit 140 generates a straight path as the path for the mobile apparatus 1 to follow the object to be followed 2 (Step S110).

Meanwhile, the difference larger than the threshold means that the moving direction of the mobile apparatus 1 and the orientation of the object to be followed 2 differ to a large extent. In this case (Step S107, NO) and if the mobile apparatus 1 has not finished moving on the curved path generated at the last minute (Step S108, NO), the path generation unit 140 generates a curved path as the path for the mobile apparatus 1 to follow the object to be followed 2 (Step S110 to Step S112). Hereinafter, the method of generating the curved path by the path generation unit 140 will be specifically described.

The path generation unit 140 generates a curved path by different methods for a case where the orientation and the moving direction of the mobile apparatus 1 are not linked to each other (capable of being independently controlled) (Step S110, YES) and for a case where the orientation and the moving direction of the mobile apparatus 1 are linked to each other (incapable of being independently controlled) (Step S110, NO). In other words, the path generation unit 140 performs a different method of generating a curved path in accordance with the control characteristics of the mobile apparatus 1. In other words, the path generation unit 140 generates different curved paths in accordance with the control characteristics of the mobile apparatus 1, irrespective of the same position of the path start point (the position of the current location of the mobile apparatus 1) and the same position of the path end point (the estimated position of the object to be followed 2).

Figure 7:
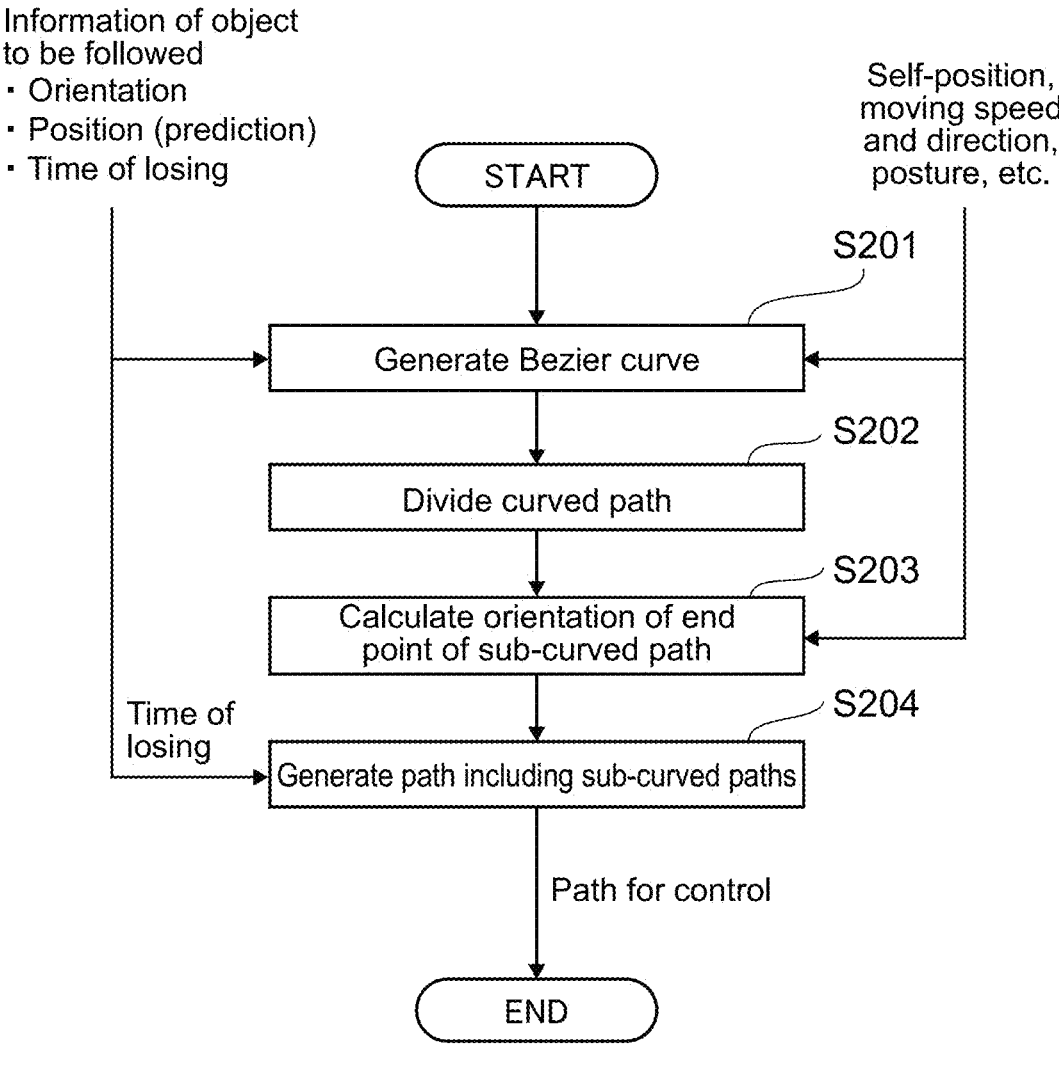
FIG. 7 shows a flow of a method of generating a curved path when an orientation and a moving direction of the mobile apparatus are not linked to each other.
Figure 8:
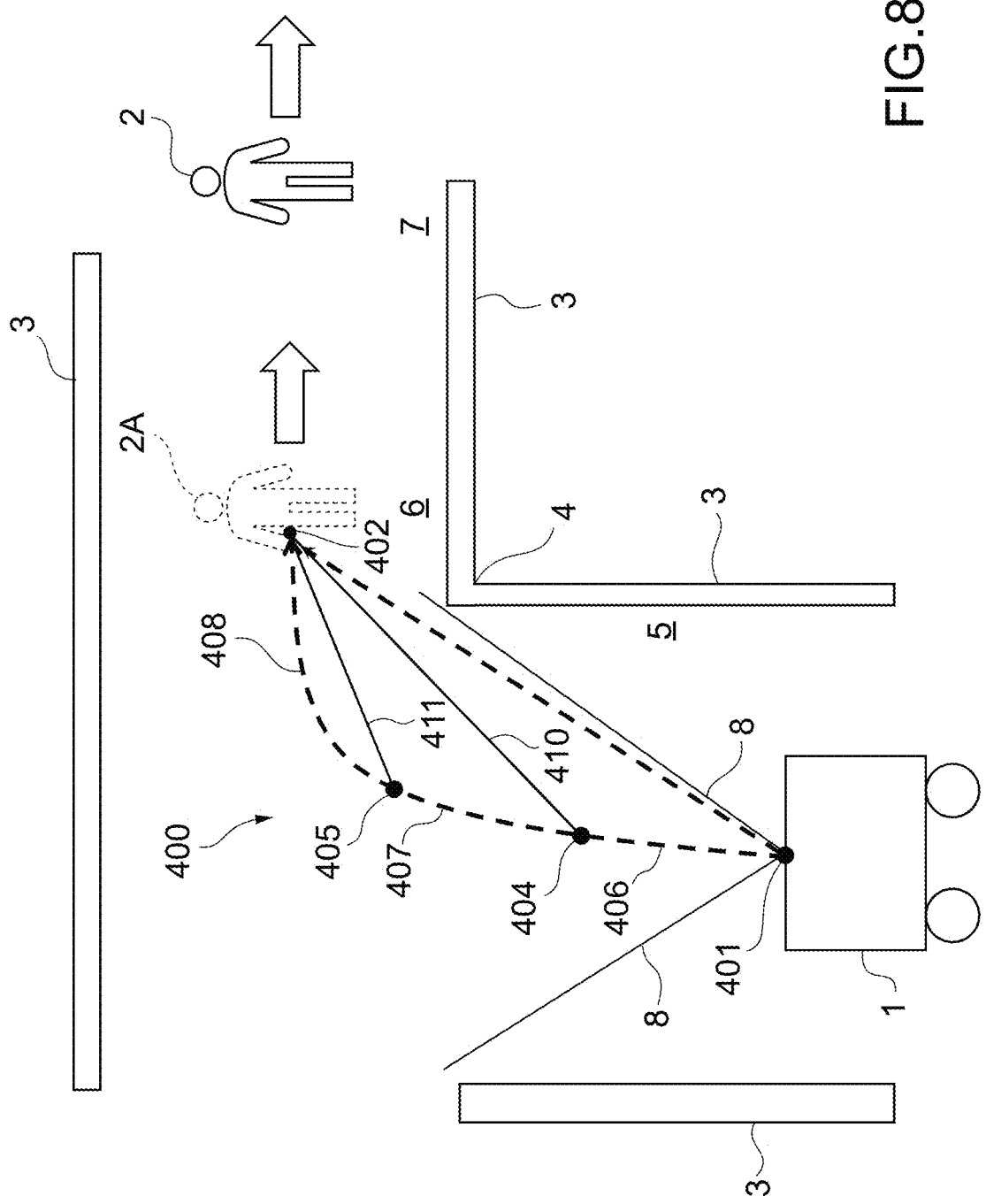
FIG. 8 schematically shows the method of generating a curved path when the orientation and the moving direction of the mobile apparatus are not linked to each other.

FIG. 7 shows a flow of the method of generating a curved path when the orientation and the moving direction of the mobile apparatus are not linked to each other. FIG. 8 schematically shows the method of generating a curved path when the orientation and the moving direction of the mobile apparatus are not linked to each other.

First, the method of generating a curved path when the orientation and the moving direction of the mobile apparatus 1 are not linked to each other (Step S111) will be described. The path generation unit 140 determines a position and an orientation of a path start point 401 (the current location of the mobile apparatus 1) and a position and an orientation of a path end point 402 (the target location of the mobile apparatus 1). The position and the orientation of the path start point 401 are the position of the current location of the mobile apparatus 1 and the current orientation of the mobile apparatus 1. The position of the path end point 402 is the estimated position 2A of the object to be followed 2 (Step S105). The path generation unit 140 determines the orientation of the path end point 402 on the basis of the orientation of the object to be followed 2 (Step S105). Specifically, the path generation unit 140 determines the orientation of the path end point 402 such that the orientation of the path end point 402 matches the orientation of the object to be followed 2. The path generation unit 140 generates a Bezier curve 400 leading to the path end point 402 from the path start point 401 on the basis of the position and orientation of the path start point 401 and the position and orientation of the path end point 402 (Step S201). The Bezier curve is a curve connecting the start point and the end point, which is determined on the basis of the position and orientation of the start point and the position and orientation of the end point.

The path generation unit 140 divides the generated Bezier curve 400 by a plurality of division points to generate a plurality of sub-curved paths each including two division points adjacent to each other (Step S202). In this example, the path generation unit 140 generates a first sub-curved path 406 leading to a first division point 404 from the path start point 401, a second sub-curved path 407 leading to a second division point 405 from the first division point 404, and a third sub-curved path 408 leading to the path end point 402 from the second division point 405.

The path generation unit 140 generates a plurality of sub-curved paths such that the orientation of the end point of each sub-curved path matches the orientation of a straight line connecting the end point of the sub-curved path and the estimated position 2A (that is, the path end point 402) of the object to be followed 2. In other words, the path generation unit 140 changes the orientation of the end point of each sub-curved path and then generates a Bezier curve corresponding to each sub-curved path to update each sub-curved path.

In this example, the path generation unit 140 does not change the position and orientation of the path start point 401 and the position of the first division point 404, and changes the orientation of the first division point 404 to the orientation of a straight line 410 leading to the path end point 402 from the first division point 404. The path generation unit 140 then generates the Bezier curve leading to the first division point 404 from the path start point 401 and sets the generated Bezier curve as the first sub-curved path 406. The path generation unit 140 does not change the position of the first division point 404 and the position of the second division point 405, sets the orientation of the first division point 404 as the changed orientation, and changes the orientation of the second division point 405 to the orientation of a straight line 411 leading to the path end point 402 from the second division point 405. The path generation unit 140 then generates the Bezier curve leading to the second division point 405 from the first division point 404 and sets the generated Bezier curve as the second sub-curved path 407 (Step S203). The path generation unit 140 generates a path including the updated first sub-curved path 406 and second sub-curved path 407, and the third sub-curved path 408, as the path for the mobile apparatus 1 to follow the object to be followed 2. Accordingly, the mobile apparatus 1 moves in a manner similar to lateral motion (crab walking) while focusing on the object to be followed 2, so that the mobile apparatus 1 is less likely to lose the object to be followed 2, and the continuity of the follow can be improved.

In addition, the path generation unit 140 determines the speed of the mobile apparatus 1 moving on the path (Step S204). The path generation unit 140 determines the speed of the mobile apparatus 1 on the basis of a detection result of the object to be followed 2. For example, the path generation unit 140 increases the speed of the mobile apparatus 1 in accordance with a time length during which the object to be followed 2 is lost. Specifically, the path generation unit 140 increases the speed of the mobile apparatus 1 in order that the mobile apparatus 1 rediscovers the object to be followed 2 more quickly as the time length during which the object to be followed 2 is lost becomes longer. Note that the path generation unit 140 determines a speed equal to or lower than a safety speed that can be controlled by the apparatus body, as a speed when a following speed is increased. Further, the path generation unit 140 only needs to determine the speed of the mobile apparatus 1 in accordance with the distance to the object to be followed 2 or the like. For example, as the distance to the object to be followed 2 becomes longer, the speed of the mobile apparatus 1 is increased, so that the object to be followed 2 is less likely to be lost.

Figure 10:
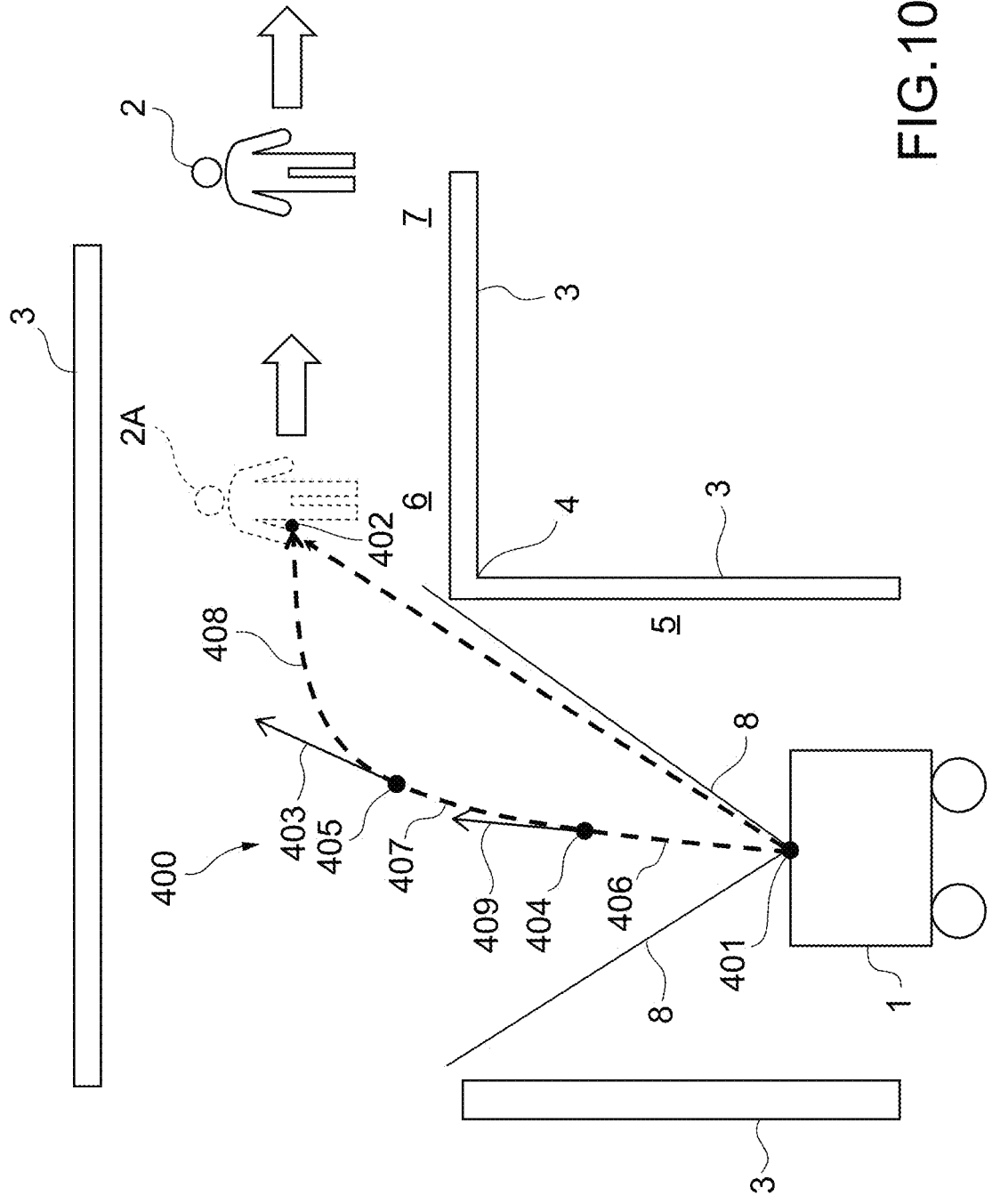
FIG. 10 schematically shows the method of generating a curved path when the orientation and the moving direction of the mobile apparatus are linked to each other.

FIG. 9 shows a flow of the method of generating a curved path when the orientation and the moving direction of the mobile apparatus are linked to each other. FIG. 10 schematically shows the method of generating a curved path when the orientation and the moving direction of the mobile apparatus are linked to each other.

Next, the method of generating a curved path when the orientation and the moving direction of the mobile apparatus 1 are linked to each other (Step S112) will be described. The path generation unit 140 generates a Bezier curve 400 leading to the path end point 402 from the path start point 401 by the method similar to the method described above (Step S201), and generates a plurality of sub-curved paths (a first sub-curved path 406 leading to a first division point 404 from the path start point 401, a second sub-curved path 407 leading to a second division point 405 from the first division point 404, and a third sub-curved path 408 leading to the path end point 402 from the second division point 405) (Step S202).

If the orientation and the moving direction of the mobile apparatus 1 are not linked to each other, the path generation unit 140 generates the Bezier curves of the plurality of sub-curved paths and connects those Bezier curves to update the path (Step S203 and Step S204). On the other hand, if the orientation and the moving direction of the mobile apparatus 1 are linked to each other, the path generation unit 140 determines the Bezier curve 400 (Step S201) as the path.

The path generation unit 140 calculates the orientation of a tangent line of an end point of each sub-curved path. In this example, the path generation unit 140 calculates the orientation of a tangent line 409 of the first division point 404 with respect to the first sub-curved path 406, the first division point 404 being the end point of the first sub-curved path 406, and the orientation of a tangent line 403 of the second division point 405 with respect to the second sub-curved path 407, the second division point 405 being the end point of the second sub-curved path 407.

The path generation unit 140 calculates a difference between the orientation of the end point of each sub-curved path and the orientation of the tangent line of the end point (Step S205). In this example, the path generation unit 140 calculates a difference between the orientation of the first division point 404, which is the end point of the first sub-curved path 406, and the orientation of the tangent line 409. The path generation unit 140 calculates the orientation of the second division point 405, which is the end point of the second sub-curved path 407, and the orientation of the tangent line 403.

The path generation unit 140 determines the speed of the mobile apparatus 1 moving on the plurality of sub-curved paths on the basis of the difference between the orientation of the end point of each sub-curved path and the orientation of the tangent line of the end point (Step S206). In other words, the path generation unit 140 makes the speed of the mobile apparatus 1 on each sub-curved path different from each other in accordance with the orientation of the end point of each sub-curved path. Specifically, the path generation unit 140 determines the speed of the mobile apparatus 1 such that the speed of the mobile apparatus 1 moving on the plurality of sub-curved paths increases as the difference between the orientation of the end point of each sub-curved path and the orientation of the tangent line of the end point becomes larger. When the object to be followed 2 is located in the vicinity of the front of the corner 4, the difference in orientation increases. This makes it possible to increase the speed on the sub-curved path leading to the corner 4. Thus, the mobile apparatus 1 can go to the vicinity of the corner 4 quickly and perform a turning motion, so that the mobile apparatus 1 can continue to capture the object to be followed 2 in the range of the field of view 8, the object to be followed 2 is less likely to be lost, and the continuity of the follow can be improved.

In such a manner, if the orientation and the moving direction of the mobile apparatus 1 are linked to each other, the path generation unit 140 determines the Bezier curve 400 as the path, and then makes the speeds for the sub-curved paths 406, 407, and 408 included in the path different from each other. In this case as well, the path generation unit 140 increases the speed of the mobile apparatus 1 in order that the mobile apparatus 1 rediscovers the object to be followed 2 more quickly as the time length during which the object to be followed 2 is lost becomes longer (Step S207).

The following control unit 150 controls the moving mechanism 300 such that the mobile apparatus 1 moves on the path determined by the path generation unit 140 at the speed determined by the path generation unit 140 (Step S113). This makes it possible for the mobile apparatus 1 to continue to capture the object to be followed 2 in the range of the field of view 8, so that the object to be followed 2 is less likely to be lost, and the continuity of the follow can be improved.

4. Conclusion

According to this embodiment, the mobile apparatus 1 generates the path of the mobile apparatus 1 (arrow C) on the basis of the orientation of the object to be followed 2 (that is, the direction in which the object to be followed 2 is going to move), instead of the direction in which the object to be followed 2 is currently moving. This makes it possible for the mobile apparatus 1 to continue to capture the object to be followed 2 in the range of the field of view 8 and thus continue to follow the object to be followed 2 without losing the object to be followed 2, and also possible to rediscover the object to be followed 2 quickly even if the mobile apparatus 1 loses the object to be followed 2.

5. Modified Examples

In the embodiment described above, the mobile apparatus 1 includes the information processing apparatus 100, the detection apparatus group 200, and the moving mechanism 300. Instead of the above, the mobile apparatus 1 may include the detection apparatus group 200 and the moving mechanism 300, and an external information processing apparatus 100 capable of wireless communication may generate a path of the mobile apparatus 1 on the basis of a detection result of the detection apparatus group 200 of the mobile apparatus 1 and supply the generated path to the mobile apparatus 1. Alternatively, the mobile apparatus 1 may include the moving mechanism 300, and an external information processing apparatus 100 capable of wireless communication may generate a path of the mobile apparatus 1 on the basis of a detection result of an external detection apparatus group 200 and supply the generated path to the mobile apparatus 1.

6. Configuration Example When Mobile Apparatus is Automated Driving Vehicle

A configuration example when the mobile apparatus 1 is an automated driving vehicle will be described.

Figure 11:
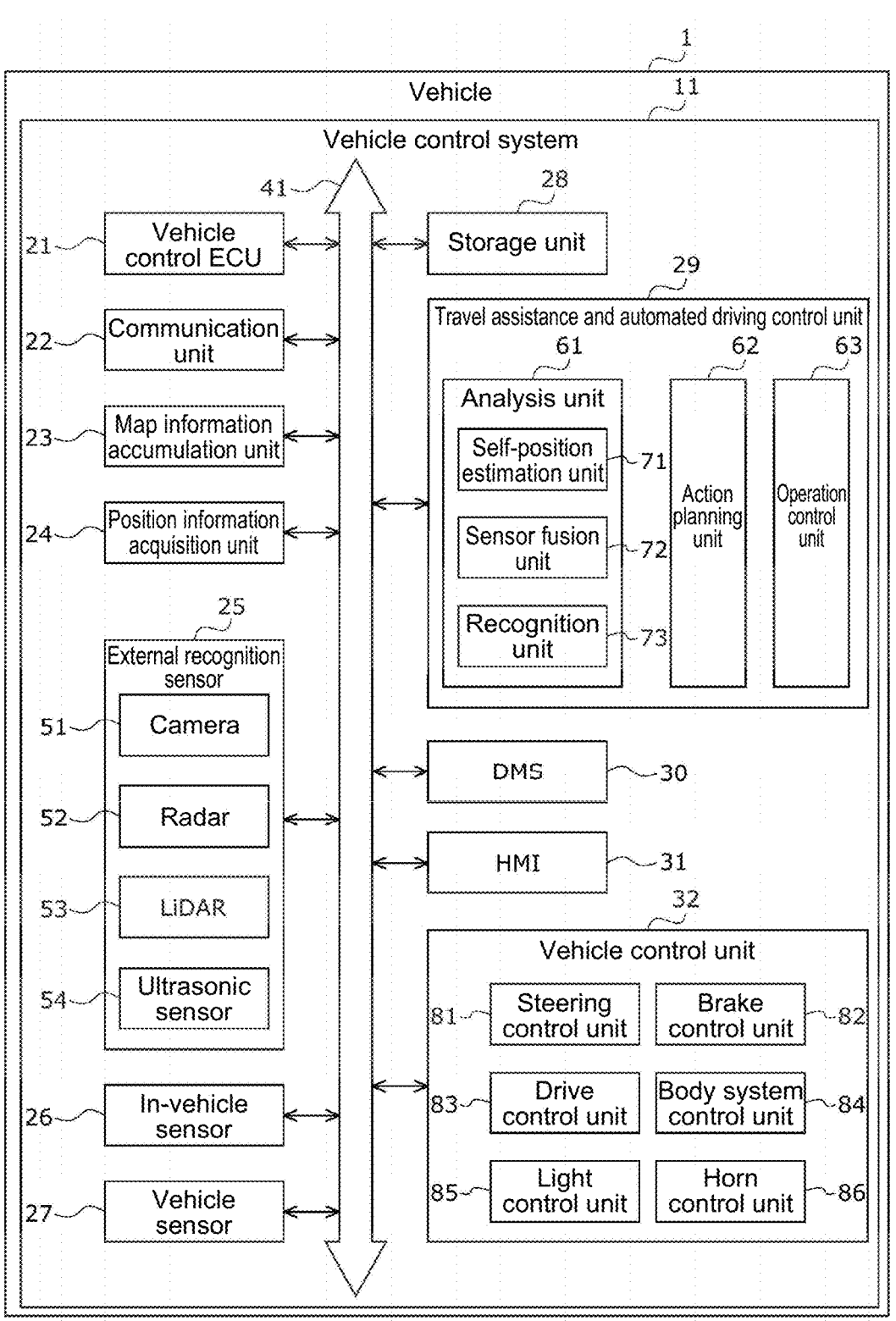
FIG. 11 is a block diagram showing a configuration example of a vehicle control system.

FIG. 11 is a block diagram showing a configuration example of a vehicle control system 11 that is an example of a mobile apparatus control system to which the present technology is applied.

The vehicle control system 11 is provided to a vehicle 1 and performs processing related to travel assistance and automated driving of the vehicle 1.

The vehicle control system 11 includes a vehicle control electronic control unit (ECU) 21, a communication unit 22, a map information accumulation unit 23, a position information acquisition unit 24, an external recognition sensor 25, an in-vehicle sensor 26, a vehicle sensor 27, a storage unit 28, a travel assistance and automated driving control unit 29, a driver monitoring system (DMS) 30, a human machine interface (HMI) 31, and a vehicle control unit 32.

The vehicle control ECU 21, the communication unit 22, the map information accumulation unit 23, the position information acquisition unit 24, the external recognition sensor 25, the in-vehicle sensor 26, the vehicle sensor 27, the storage unit 28, the travel assistance and automated driving control unit 29, the driver monitoring system (DMS) 30, the human machine interface (HMI) 31, and the vehicle control unit 32 are communicably connected to each other via a communication network 41. The communication network 41 includes, for example, an in-vehicle communication network, a bus, or the like conforming to digital bidirectional communication standards such as a controller area network (CAN), a local interconnect network (LIN), a local area network (LAN), FlexRay (registered trademark), and Ethernet (registered trademark). The communication network 41 may be selectively used depending on the type of data to be transmitted. For example, CAN may be applied to data related to vehicle control, and the Ethernet may be applied to large-capacity data. Note that the units of the vehicle control system 11 are directly connected to each other using wireless communication assuming relatively short-distance communication, such as near field communication (NFC) and Bluetooth (registered trademark), without the communication network 41 in some cases.

Note that the description of the communication network 41 is hereinafter omitted when each unit of the vehicle control system 11 performs communication via the communication network 41. For example, when the vehicle control ECU 21 and the communication unit 22 perform communication via the communication network 41, it is simply described that the vehicle control ECU 21 and the communication unit 22 perform communication.

The vehicle control ECU 21 includes, for example, various processors such as a central processing unit (CPU) and a micro processing unit (MPU). The vehicle control ECU 21 controls all or a part of the functions of the vehicle control system 11.

The communication unit 22 performs communication with various devices inside and outside the vehicle, other vehicles, servers, base stations, and the like, and transmits and receives various types of data. At that time, the communication unit 22 can perform communication using a plurality of communication methods.

Communication with the outside of the vehicle, which can be performed by the communication unit 22, will be schematically described. The communication unit 22 performs communication with a server on an external network (hereinafter, referred to as external server) or the like via a base station or an access point by, for example, a wireless communication method such as a fifth-generation mobile communication system (5G), long term evolution (LTE), or dedicated short range communications (DSRC). The external network through which the communication unit 22 performs communication is, for example, the Internet, a cloud network, or a network specific to a business operator. The communication method performed by the communication unit 22 for the external network is not particularly limited as long as the communication method is a wireless communication method capable of performing digital bidirectional communication at a predetermined communication speed or higher and at a predetermined distance or more.

Further, for example, the communication unit 22 can perform communication with a terminal located in the vicinity of the own vehicle by using a peer-to-peer (P2P) technology. The terminal located in the vicinity of the own vehicle is, for example, a terminal that is mounted on a mobile object moving at a relatively low speed, such as a pedestrian or a bicycle, a terminal fixed in position in a store or the like, or a machine-type communication (MTC) terminal. In addition, the communication unit 22 can also perform vehicle-to-everything (V2X) communication. The V2X communication refers to, for example, communication between the own vehicle and others, such as vehicle-to-vehicle communication with another vehicle, vehicle-to-infrastructure communication with a roadside device or the like, vehicle-to-home communication with a home, and vehicle-to-pedestrian communication with a terminal or the like carried by a pedestrian.

The communication unit 22 can receive, for example, a program for updating software for controlling an operation of the vehicle control system 11 from the outside (Over The Air). In addition, the communication unit 22 can receive information such as map information, traffic information, or information of the surroundings of the vehicle 1 from the outside. Further, for example, the communication unit 22 can transmit information regarding the vehicle 1, information of the surroundings of the vehicle 1, or the like to the outside. The information regarding the vehicle 1, which is transmitted by the communication unit 22 to the outside, includes, for example, data indicating a state of the vehicle 1 or a recognition result provided by a recognition unit 73. In addition, for example, the communication unit 22 performs communication corresponding to a vehicle emergency call system such as eCall.

For example, the communication unit 22 receives an electromagnetic wave transmitted by a road traffic information communication system (vehicle information and communication system (VICS) (registered trademark)), such as a radio beacon, an optical beacon, or FM multiplex broadcasting.

Communication with the inside of the vehicle, which can be performed by the communication unit 22, will be schematically described. The communication unit 22 can perform communication with each in-vehicle device by using, for example, wireless communication. The communication unit 22 can perform wireless communication with the in-vehicle device by, for example, a communication method capable of performing digital bidirectional communication at a predetermined communication speed or higher through wireless communication, such as a wireless LAN, Bluetooth, NFC, or wireless USB (WUSB). The communication unit 22 is not limited to the above and can also perform communication with each in-vehicle device using wired communication. For example, the communication unit 22 can perform communication with each in-vehicle device through wired communication via a cable connected to a connection terminal (not shown). The communication unit 22 can perform communication with each in-vehicle device by, for example, a communication method capable of performing digital bidirectional communication at a predetermined communication speed or higher through wired communication, such as a universal serial bus (USB), a high-definition multimedia interface (HDMI) (registered trademark), or a mobile high-definition link (MHL).

Here, the in-vehicle device refers to, for example, a device that is not connected to the communication network 41 in the vehicle. Examples of the in-vehicle devices assumed include a mobile device or wearable device carried by a passenger such as a driver, and an information device that is brought into the vehicle and temporarily installed in the vehicle.

The map information accumulation unit 23 accumulates one or both of a map acquired from the outside and a map created by the vehicle 1. For example, the map information accumulation unit 23 accumulates a three-dimensional high-accuracy map, a global map that is lower in accuracy than the high-accuracy map and covers a wide area, or the like.

The high-accuracy map is, for example, a dynamic map, a point cloud map, a vector map, or the like. The dynamic map is, for example, a map including four layers of dynamic information, quasi-dynamic information, quasi-static information, and static information, and is provided from the external server or the like to the vehicle 1. The point cloud map is a map configured by point cloud (point cloud data). The vector map is, for example, a map in which traffic information such as a position of a lane or a traffic light is associated with a point cloud map and adapted to an advanced driver assistance system (ADAS) or autonomous driving (AD).

For example, the point cloud map and the vector map may be provided from the external server or the like, or may be created by the vehicle 1 as maps for performing matching with a local map, which will be described later, on the basis of a sensing result provided by a camera 51, a radar 52, a LiDAR 53, or the like and then accumulated in the map information accumulation unit 23. Further, if a high-accuracy map is provided from the external server or the like, in order to reduce the communication capacity, for example, map data of several hundred meters square, regarding a planned path through which the vehicle 1 will travel, is acquired from the external server or the like.

The position information acquisition unit 24 receives a global navigation satellite system (GNSS) signal from a GNSS satellite and acquires position information of the vehicle 1. The acquired position information is supplied to the travel assistance and automated driving control unit 29. Note that the position information acquisition unit 24 is not limited to the method using a GNSS signal, and may acquire position information by using a beacon, for example.

The external recognition sensor 25 includes various sensors used to recognize a situation outside the vehicle 1, and supplies sensor data from the sensors to the units of the vehicle control system 11. The type and number of sensors included in the external recognition sensor 25 are discretionally set.

For example, the external recognition sensor 25 includes a camera 51, a radar 52, a LiDAR (Light Detection and Ranging, Laser Imaging Detection and Ranging) 53, and an ultrasonic sensor 54. The external recognition sensor 25 is not limited to the above, and may be configured to include one or more types of sensors among the camera 51, the radar 52, the LiDAR 53, and the ultrasonic sensor 54. The number of cameras 51, radars 52, LiDARs 53, and ultrasonic sensors 54 is not particularly limited as long as they can be practically installed in the vehicle 1. Further, the type of sensors included in the external recognition sensor 25 is not limited to the above example, and the external recognition sensor 25 may include other types of sensors. Examples of sensing regions of the respective sensors included in the external recognition sensor 25 will be described later.

Note that an imaging method of the camera 51 is not particularly limited. For example, cameras of various imaging methods, such as a time-of-flight (ToF) camera, a stereo camera, a monocular camera, and an infrared ray camera using imaging methods capable of ranging, can be applied to the camera 51 as necessary. The camera 51 is not limited to the above and may be a camera for simply acquiring a captured image irrespective of ranging.

Further, for example, the external recognition sensor 25 can include an environment sensor for detecting an environment with respect to the vehicle 1. The environment sensor is a sensor for detecting an environment such as weather, an atmospheric phenomenon, or brightness, and can include various sensors such as a raindrop sensor, a fog sensor, a sunshine sensor, a snow sensor, and an illuminance sensor.

In addition, for example, the external recognition sensor 25 includes a microphone used for detecting sound around the vehicle 1 or a position of a sound source, for example.

The in-vehicle sensor 26 includes various sensors for detecting information of the inside of the vehicle, and supplies sensor data from the sensors to the units of the vehicle control system 11. The type or number of various sensors included in the in-vehicle sensor 26 is not particularly limited as long as they can be practically installed in the vehicle 1.

For example, the in-vehicle sensor 26 can include one or more types of sensors among a camera, a radar, a seating sensor, a steering wheel sensor, a microphone, and a biometric sensor. As the camera included in the in-vehicle sensor 26, for example, cameras of various imaging methods capable of ranging, such as a time-of-flight (ToF) camera, a stereo camera, a monocular camera, and an infrared ray camera, can be used. The camera included in the in-vehicle sensor 26 is not limited to the above and may be a camera for simply acquiring a captured image irrespective of ranging. The biometric sensor included in the in-vehicle sensor 26 is provided to, for example, a seat or a steering wheel and detects various types of biometric information of a passenger such as a driver.

The vehicle sensor 27 includes various sensors for detecting a state of the vehicle 1 and supplies sensor data obtained from the sensors to the units of the vehicle control system 11. The type or number of various sensors included in the vehicle sensor 27 is not particularly limited as long as they can be practically installed in the vehicle 1.

For example, the vehicle sensor 27 includes a speed sensor, an acceleration sensor, an angular velocity sensor (gyro sensor), and an inertial measurement unit (IMU) that integrates those above sensors. For example, the vehicle sensor 27 includes a steering angle sensor that detects a steering angle of a steering wheel, a yaw rate sensor, an accelerator sensor that detects the amount of operation of an accelerator pedal, and a brake sensor that detects the amount of operation of a brake pedal. For example, the vehicle sensor 27 includes a rotation sensor that detects revolutions per minute of an engine or a motor, a pneumatic sensor that detects a tire pressure, a slip rate sensor that detects a slip rate of a tire, and a wheel speed sensor that detects a rotation speed of a wheel. For example, the vehicle sensor 27 includes a battery sensor that detects a remaining battery level and a temperature of a battery, and an impact sensor that detects an impact from the outside.

The storage unit 28 includes at least one of a non-volatile storage medium or a volatile storage medium, and stores data and a program. The storage unit 28 is used as, for example, an electrically erasable programmable read only memory (EEPROM) and a random access memory (RAM). As the storage medium, a magnetic storage device such as a hard disc drive (HDD), a semiconductor storage device, an optical storage device, and a magneto-optical storage device can be applied. The storage unit 28 stores various programs or data that are used by the units of the vehicle control system 11. For example, the storage unit 28 includes an event data recorder (EDR) or a data storage system for automated driving (DSSAD) and stores information of the vehicle 1 before and after an event such as an accident or information acquired by the in-vehicle sensor 26.

The travel assistance and automated driving control unit 29 performs control of travel assistance and automated driving of the vehicle 1. For example, the travel assistance and automated driving control unit 29 includes an analysis unit 61, an action planning unit 62, and an operation control unit 63.

The analysis unit 61 performs analysis processing of the vehicle 1 and a surrounding situation. The analysis unit 61 includes a self-position estimation unit 71, a sensor fusion unit 72, and a recognition unit 73.

The self-position estimation unit 71 estimates a self-position of the vehicle 1 on the basis of the sensor data from the external recognition sensor 25 and a high-accuracy map accumulated in the map information accumulation unit 23. For example, the self-position estimation unit 71 generates a local map on the basis of the sensor data from the external recognition sensor 25 and estimates a self-position of the vehicle 1 by matching the local map with the high-accuracy map. The position of the vehicle 1 is based on, for example, the center of a rear wheel pair axle.

The local map is, for example, a three-dimensional high-accuracy map created using a technology such as simultaneous localization and mapping (SLAM), an occupancy grid map, or the like. The three-dimensional high-accuracy map is, for example, the above-mentioned point cloud map. The occupancy grid map is a map that is obtained by dividing a three-dimensional or two-dimensional space around the vehicle 1 into grids having a predetermined size and indicates the occupied state of an object in units of grids. The occupied state of an object is indicated by, for example, the presence or absence of the object or a probability of presence. The local map is also used in, for example, detection processing and recognition processing of a situation outside the vehicle 1 by the recognition unit 73.

Note that the self-position estimation unit 71 may estimate a self-position of the vehicle 1 on the basis of the position information acquired by the position information acquisition unit 24 and the sensor data from the vehicle sensor 27.

The sensor fusion unit 72 performs sensor fusion processing for obtaining new information by combining a plurality of different types of sensor data (for example, image data supplied from the camera 51 and sensor data supplied from the radar 52). Examples of the method of combining different types of sensor data include integration, fusion, and association.

The recognition unit 73 performs detection processing for detecting a situation outside the vehicle 1 and recognition processing for recognizing a situation outside the vehicle 1.

For example, the recognition unit 73 performs detection processing and recognition processing of a situation outside the vehicle 1 on the basis of information from the external recognition sensor 25, information from the self-position estimation unit 71, information from the sensor fusion unit 72, and the like.

Specifically, for example, the recognition unit 73 performs detection processing, recognition processing, and the like of an object around the vehicle 1. The detection processing of an object is, for example, processing of detecting the presence or absence, size, shape, position, and motion of an object. The recognition processing of an object is, for example, processing of recognizing an attribute such as a type of an object or identifying a specific object. Note that the detection processing and the recognition processing are not necessarily clearly separated from each other and overlap with each other in some cases.

For example, the recognition unit 73 detects an object around the vehicle 1 by performing clustering for classifying a point cloud based on the sensor data, which is provided by the radar 52, the LiDAR 53, or the like, into clusters of point cloud. Thus, the presence or absence, size, shape, and position of the object around the vehicle 1 are detected.

For example, the recognition unit 73 performs tracking for following the motion of the clusters of point cloud classified by clustering, to detect the motion of the object around the vehicle 1. Thus, the speed and the traveling direction (movement vector) of the object around the vehicle 1 are detected.

For example, the recognition unit 73 detects or recognizes a vehicle, a person, a bicycle, an obstacle, a structure, a road, a traffic light, a traffic sign, a road sign, or the like on the basis of the image data supplied from the camera 51. Further, the recognition unit 73 may recognize the type of the object around the vehicle 1 by performing recognition processing such as semantic segmentation.

For example, the recognition unit 73 can perform recognition processing of traffic rules around the vehicle 1 on the basis of the map accumulated in the map information accumulation unit 23, an estimation result of the self-position by the self-position estimation unit 71, and a recognition result of the object around the vehicle 1 by the recognition unit 73. By such processing, the recognition unit 73 can recognize a position and a state of a traffic light, contents of a traffic sign and a road sign, contents of traffic restriction, a travelable lane, and the like.

For example, the recognition unit 73 can perform recognition processing of the environment around the vehicle 1. As the surrounding environment to be recognized by the recognition unit 73, weather, temperature, humidity, brightness, a state of a road surface, and the like are assumed.

The action planning unit 62 creates an action plan of the vehicle 1. For example, the action planning unit 62 creates an action plan by performing processing of path planning and path tracking.

Note that the path planning (global path planning) refers to processing of planning a rough path from the start to the goal. Such path planning also includes processing called trajectory planning, which performs trajectory generation (local path planning) capable of safe and smooth traveling in the vicinity of the vehicle 1 in consideration of motion characteristics of the vehicle 1 in the planned path.

The path tracking is processing of planning an operation for safe and smooth traveling on a path planned by the path planning within a planned time. The action planning unit 62 can calculate a target speed and a target angular velocity of the vehicle 1 on the basis of, for example, a processing result of the path tracking.

The operation control unit 63 controls an operation of the vehicle 1 in order to implement the action plan created by the action planning unit 62.

For example, the operation control unit 63 controls a steering control unit 81, a brake control unit 82, and a drive control unit 83, which are included in the vehicle control unit 32 to be described later, to perform acceleration/deceleration control and direction control such that the vehicle 1 travels in a trajectory calculated by the trajectory planning. For example, the operation control unit 63 performs cooperative control for the purpose of implementing the functions of ADAS, such as collision avoidance or shock relaxation, following travel, vehicle speed maintaining travel, collision warning of the own vehicle, and lane departure warning of the own vehicle. For example, the operation control unit 63 performs cooperative control for the purpose of automated driving for traveling in an automated manner regardless of an operation of the driver.

The DMS 30 performs authentication processing of a driver, recognition processing of a state of the driver, or the like on the basis of the sensor data from the in-vehicle sensor 26, input data that is input to the HMI 31 to be described later, or the like. As the state of the driver to be recognized, for example, a health condition, a degree of consciousness, a degree of concentration, a degree of fatigue, a gaze direction, a degree of inebriation, a driving operation, a posture, and the like are assumed.

Note that the DMS 30 may perform authentication processing of a passenger other than the driver and recognition processing of a state of the passenger. Further, for example, the DMS 30 may perform recognition processing of a situation inside the vehicle on the basis of the sensor data from the in-vehicle sensor 26. As the situation inside the vehicle to be recognized, for example, temperature, humidity, brightness, smell, and the like are assumed.

The HMI 31 inputs various types of data, instructions, or the like, and presents various types of data to the driver or the like.

The input of data by the HMI 31 will be schematically described. The HMI 31 includes an input device used for a person to input data. The HMI 31 generates an input signal on the basis of the data, instruction, or the like input by the input device, and supplies the input signal to the units of the vehicle control system 11. The HMI 31 includes an operation element such as a touch panel, a button, a switch, or a lever as the input device. The HMI 31 is not limited to the above, and may further include an input device capable of inputting information by a method other than a manual operation, e.g., voice or gesture. In addition, the HMI 31 may also use, for example, a remote control apparatus using infrared rays or radio waves, or an externally connected device such as a mobile device or wearable device corresponding to an operation of the vehicle control system 11, as the input device.

The presentation of the data by the HMI 31 will be schematically described. The HMI 31 generates visual information, auditory information, and tactile information for the passenger or the outside of the vehicle. Further, the HMI 31 performs output control for controlling output of each piece of generated information, contents of output, an output timing, an output method, and the like. The HMI 31 generates and outputs, for example, information indicated by images and light, such as an operation screen, display of the state of the vehicle 1, display of a warning, or a monitor image indicating a situation of the surroundings of the vehicle 1, as the visual information. Further, the HMI 31 generates and outputs, for example, information indicated by sounds, such as a voice guidance, a warning sound, or a warning message, as the auditory information. In addition, the HMI 31 generates and outputs, for example, information given to the sense of touch of the passenger by force, vibration, motion, or the like, as the tactile information.

As an output device from which the HMI 31 outputs the visual information, for example, a display apparatus that presents visual information by displaying an image by itself or a projector apparatus that presents visual information by projecting an image can be applied. Note that the display apparatus may be an apparatus that displays visual information within the field of view of a passenger, such as a head-up display, a transmissive display, or a wearable device having an augmented reality (AR) function, in addition to a display apparatus including a normal display. Further, in the HMI 31, a display device included in a navigation apparatus, an instrument panel, a camera monitoring system (CMS), an electronic mirror, a lamp, or the like provided in the vehicle 1 can also be used as an output device that outputs the visual information.

As an output device from which the HMI 31 outputs the auditory information, for example, an audio speaker, a headphone, or an earphone can be applied.

As an output device from which the HMI 31 outputs the tactile information, for example, a haptic element using a haptic technology can be applied. The haptic element is provided at, for example, a portion with which a passenger of the vehicle 1 comes into contact, such as a steering wheel or a seat.

The vehicle control unit 32 controls each unit of the vehicle 1. The vehicle control unit 32 includes the steering control unit 81, the brake control unit 82, the drive control unit 83, a body system control unit 84, a light control unit 85, and a horn control unit 86.

The steering control unit 81 detects and controls a state of a steering system of the vehicle 1, for example. The steering system includes, for example, a steering mechanism including a steering wheel and the like, an electric power steering, and the like. The steering control unit 81 includes, for example, a steering ECU that controls the steering system, an actuator that drives the steering system, and the like.

The brake control unit 82 detects and controls a state of a brake system of the vehicle 1, for example. The brake system includes, for example, a brake mechanism including a brake pedal and the like, an antilock brake system (ABS), a regenerative brake mechanism, and the like. The brake control unit 82 includes, for example, a brake ECU that controls the brake system, an actuator that drives the brake system, and the like.

The drive control unit 83 detects and controls a state of a drive system of the vehicle 1, for example. The drive system includes, for example, a drive-force generating device for generating a drive force, such as an accelerator pedal, an internal combustion engine, or a drive motor, a drive-force transmission mechanism for transmitting a drive force to wheels, and the like. The drive control unit 83 includes, for example, a drive ECU that controls the drive system, an actuator that drives the drive system, and the like.

The body system control unit 84 detects and controls a state of a body system of the vehicle 1, for example. The body system includes, for example, a keyless entry system, a smart key system, a power window apparatus, a power seat, an air conditioner, an airbag, a seat belt, and a shift lever. The body system control unit 84 includes, for example, a body system ECU that controls the body system, and an actuator that drives the body system.

The light control unit 85 detects and controls states of various lights of the vehicle 1, for example. As a light to be controlled, for example, a headlight, a backlight, a fog light, a turn signal, a brake light, a projection, and display of a bumper are assumed. The light control unit 85 includes a light ECU that controls the light, an actuator that drives the light, or the like.

The horn control unit 86 detects and controls a state of a car horn of the vehicle 1, for example. The horn control unit 86 includes, for example, a horn ECU that controls the car horn, and an actuator that drives the car horn.

Figure 12:
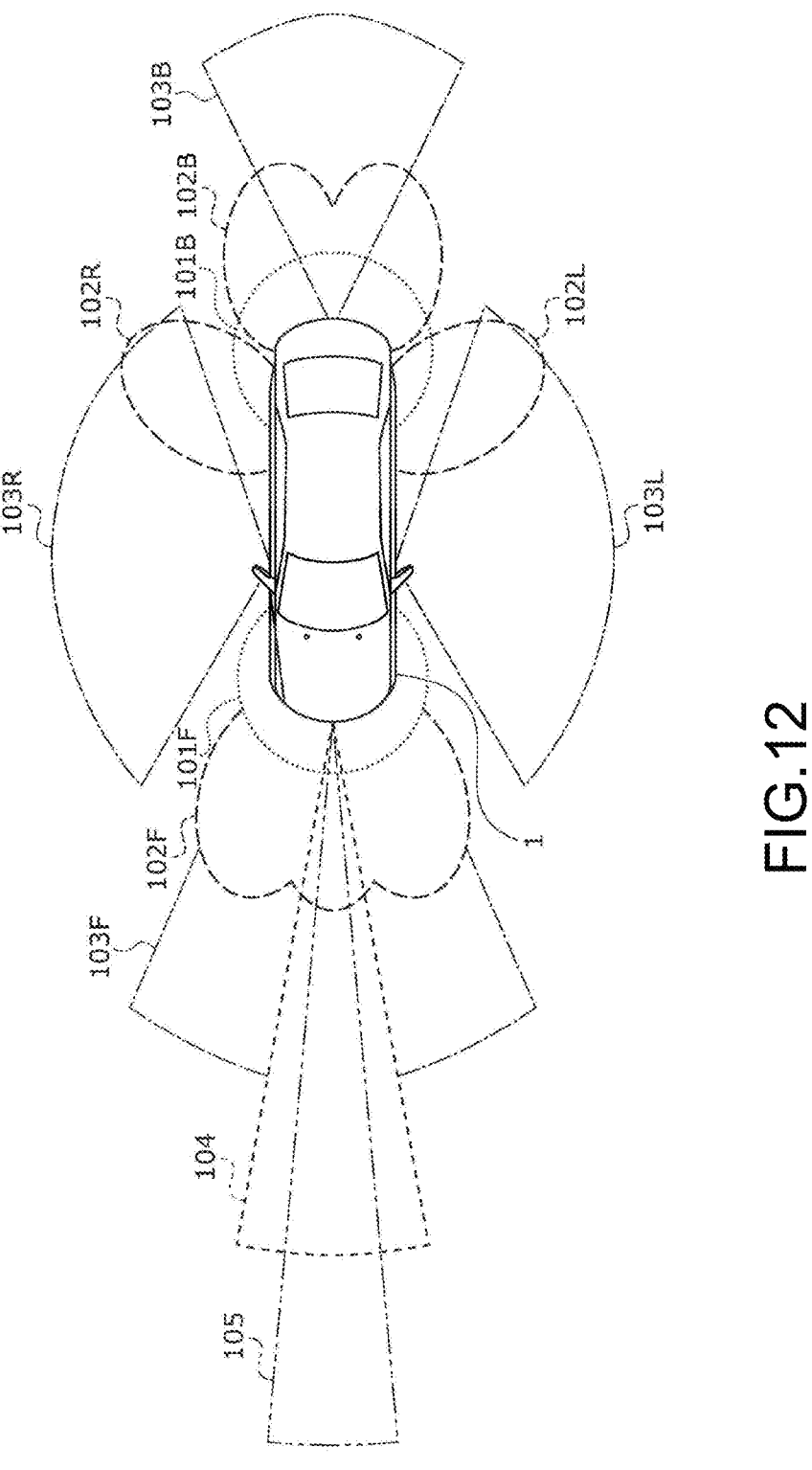
FIG. 12 is a diagram showing an example of sensing regions.

FIG. 12 is a diagram showing an example of sensing regions of the camera 51, the radar 52, the LiDAR 53, the ultrasonic sensor 54, and the like of the external recognition sensor 25 of FIG. 11. Note that FIG. 12 schematically shows a state of the vehicle 1 viewed from the upper surface, in which the left end side is a front end (front) side of the vehicle 1, and the right end side is a rear end (rear) side of the vehicle 1.

A sensing region 101F and a sensing region 101B represent exemplary sensing regions of the ultrasonic sensor 54. The sensing region 101F covers the periphery of the front end of the vehicle 1 by a plurality of ultrasonic sensors 54. The sensing region 101B covers the periphery of the rear end of the vehicle 1 by the plurality of ultrasonic sensors 54.

Sensing results in the sensing region 101F and the sensing region 101B are used, for example, for parking assistance of the vehicle 1.

A sensing region 102F to a sensing region 102B represent exemplary sensing regions of the radar 52 for short distance or medium distance. The sensing region 102F covers a position farther than the sensing region 101F in front of the vehicle 1. The sensing region 102B covers a position farther than the sensing region 101B in the rear of the vehicle 1. A sensing region 102L covers a rear periphery of a left side surface of the vehicle 1. A sensing region 102R covers a rear periphery of a right side surface of the vehicle 1.

A sensing result in the sensing region 102F is used, for example, to detect a vehicle, a pedestrian, or the like located in front of the vehicle 1. A sensing result in the sensing region 102B is used, for example, for a function of preventing collision in the rear of the vehicle 1. Sensing results in the sensing region 102L and the sensing region 102R are used, for example, to detect an object at a blind spot on the side of the vehicle 1.

A sensing region 103F to a sensing region 103B represent exemplary sensing regions of the camera 51. The sensing region 103F covers a position farther than the sensing region 102F in front of the vehicle 1. The sensing region 103B covers a position farther than the sensing region 102B in the rear of the vehicle 1. A sensing region 103L covers the periphery of the left side surface of the vehicle 1. A sensing region 103R covers the periphery of the right side surface of the vehicle 1.

A sensing result in the sensing region 103F can be used in, for example, recognition of a traffic light or a traffic sign, a lane departure prevention support system, and an automated headlight control system. A sensing result in the sensing region 103B can be used in, for example, parking assistance and a surround view system. Sensing results in the sensing region 103L and the sensing region 103R can be used, for example, in a surround view system.

A sensing region 104 represents an exemplary sensing region of the LiDAR 53. The sensing region 104 covers a position farther than the sensing region 103F in front of the vehicle 1. Meanwhile, the sensing region 104 has a narrower range in a right-left direction than that of the sensing region 103F.

A sensing result in the sensing region 104 is used, for example, to detect an object such as a surrounding vehicle.

A sensing region 105 represents an exemplary sensing region of the radar 52 for long distance.

The sensing region 105 covers a position farther than the sensing region 104 in front of the vehicle 1. Meanwhile, the sensing region 105 has a narrower range in a right-left direction than that of the sensing region 104.

A sensing result in the sensing region 105 is used, for example, in adaptive cruise control (ACC), emergency brake, or collision avoidance.

Note that the sensing regions of the respective sensors of the camera 51, the radar 52, the LiDAR 53, and the ultrasonic sensor 54 included in the external recognition sensor 25 may have various configurations other than that shown in FIG. 2. Specifically, the ultrasonic sensor 54 may perform sensing on a side of the vehicle 1, and the LiDAR 53 may perform sensing on the rear side of the vehicle 1. Further, a position at which each sensor is installed is not limited to the examples described above. Further, the number of each sensor may be one or more.

The present disclosure may also take the following configurations.

(1)

An information processing apparatus, including:

an orientation determination unit that determines an orientation of an object to be followed; and a path generation unit that determines an orientation of a path end point on the basis of the orientation of the object to be followed, the path end point being an end point of a path for a mobile apparatus to follow the object to be followed, and generates the path.

(2)

The information processing apparatus according to (1), in which the path generation unit determines the orientation of the path end point such that the orientation of the path end point matches the orientation of the object to be followed.

(3)

The information processing apparatus according to (1) or (2), in which the path generation unit generates a curved path as the path when a difference between a moving direction of the mobile apparatus and the orientation of the object to be followed is larger than a threshold.

(4)

The information processing apparatus according to any one of (1) to (3), further including a position estimation unit that determines an estimated position of the object to be followed, in which the path generation unit determines a position of the path end point on the basis of the estimated position.

(5)

The information processing apparatus according to (4), in which the position estimation unit detects the object to be followed from an image captured by the mobile apparatus, and the path generation unit determines a speed of the mobile apparatus on the basis of a detection result of the object to be followed.

(6)

The information processing apparatus according to (5), in which the path generation unit increases the speed of the mobile apparatus in accordance with a time length during which the object to be followed is lost.

(7)

The information processing apparatus according to any one of (1) to (6), in which the path generation unit generates a Bezier curve leading to the path end point, divides the Bezier curve by a plurality of division points, generates a plurality of sub-curved paths each including two division points adjacent to each other, and generates, as the path, a path including the plurality of sub-curved paths.

(8)

The information processing apparatus according to (7), in which when an orientation and the moving direction of the mobile apparatus are not linked to each other, the path generation unit generates the plurality of sub-curved paths such that an orientation of an end point of each sub-curved path matches an orientation of a straight line connecting the end point of the sub-curved path and the estimated position.

(9)

The information processing apparatus according to (6) or (7), in which when the orientation and the moving direction of the mobile apparatus are linked to each other, the path generation unit determines the Bezier curve as the path.

(10)

The information processing apparatus according to (9), in which the path generation unit determines the speed of the mobile apparatus that moves on the plurality of sub-curved paths on the basis of a difference between an orientation of an end point of each sub-curved path and an orientation of a tangent line of the end point.

(11)

The information processing apparatus according to (10), in which the path generation unit determines the speed of the mobile apparatus such that the speed of the mobile apparatus moving on the plurality of sub-curved paths increases as the difference between the orientation of the end point of each sub-curved path and the orientation of the tangent line of the end point becomes larger.

(12)

The information processing apparatus according to any one of (1) to (11), in which the orientation determination unit determines the orientation of the object to be followed on the basis of an image captured by the mobile apparatus.

(13)
An information processing method, including:
  determining an orientation of an object to be followed; and
  determining an orientation of a path end point on the basis of the orientation of the object to be followed, the path end point being an end point of a path for a mobile apparatus to follow the object to be followed, and generating the path.
(14)
An information processing program that causes an information processing apparatus to operate as:
  an orientation determination unit that determines an orientation of an object to be followed; and
  a path generation unit that determines an orientation of a path end point on the basis of the orientation of the object to be followed, the path end point being an end point of a path for a mobile apparatus to follow the object to be followed, and generates the path.
(15)
A mobile apparatus, including:
  a moving mechanism;
  an orientation determination unit that determines an orientation of an object to be followed;
  a path generation unit that determines an orientation of a path end point on the basis of the orientation of the object to be followed, the path end point being an end point of a path for following the object to be followed, and generates the path; and
  a following control unit that controls the moving mechanism to move on the path.
(16)
A non-transitory computer-readable recording medium that records an information processing program, the information processing program causing an information processing apparatus to operate as:
  an orientation determination unit that determines an orientation of an object to be followed; and
  a path generation unit that determines an orientation of a path end point on the basis of the orientation of the object to be followed, the path end point being an end point of a path for a mobile apparatus to follow the object to be followed, and generates the path.
  Each embodiment and each modified example of the present technology have been described, but the present technology is not limited to the embodiments described above and may be variously modified without departing from the spirit of the present technology.

REFERENCE SIGNS LIST 1 mobile apparatus
100 information processing apparatus
110 self-position estimation unit
120 position estimation unit
121 object-to-be-followed recognition unit
122 spatial-position estimation unit
122A current-position calculation unit
122B motion model estimation unit
130 orientation determination unit
140 path generation unit
150 following control unit
2 object to be followed
200 detection apparatus group
210 imaging apparatus
220 ranging apparatus
230 internal sensor
300 moving mechanism

The invention claimed is:
1. An information processing apparatus, comprising:
a central processing unit (CPU) configured to:
  detect an object from an image captured by a mobile apparatus, wherein the mobile apparatus is configured to follow the object;
  determine, based on the detection of the object, a speed of the mobile apparatus to follow the object;
  increase the determined speed of the mobile apparatus based on a time length, wherein the object is lost for the time length;
  determine an orientation of the object based on the detection of the object;
  determine an orientation of a path end point based on the determined orientation of the object;
  generate, based on the determined orientation of the path end point, a path for the mobile apparatus to follow the object, wherein the path end point is an end point of the generated path; and
  control, based on the increased speed and the generated path, a moving mechanism of the mobile apparatus to move on the generated path.
2. The information processing apparatus according to claim 1, wherein
  the determined orientation of the path end point matches the determined orientation of the object.
3. The information processing apparatus according to claim 1, wherein the CPU is further configured to:
  determine a difference between a moving direction of the mobile apparatus and the determined orientation of the object;
  determine that the determined difference is larger than a threshold; and
  generate, based on the determination that the determined difference is larger than the threshold, a curved path as the path.
4. The information processing apparatus according to claim 1, wherein the CPU is further configured to:
  determine an estimated position of the object; and
  determine a position of the path end point based on the estimated position.
5. The information processing apparatus according to claim 1, wherein the CPU is further configured to:
  generate a Bezier curve that leads to the path end point;
  divide the Bezier curve by a plurality of division points;
  generate a plurality of sub-curved paths based on the division of the Bezier curve, wherein each of the plurality of sub-curved paths includes two adjacent division points of the plurality of division points; and
  generate the path based on the plurality of sub-curved paths, wherein the generated path includes the plurality of sub-curved paths.
6. The information processing apparatus according to claim 5, wherein the CPU is further configured to:
  determine an estimated position of the object;
  determine that an orientation of the mobile apparatus and a moving direction of the mobile apparatus are independently controllable; and
  generate the plurality of sub-curved paths based on the determination that the orientation of the mobile apparatus and the moving direction of the mobile apparatus are independently controllable, wherein
    an orientation of an end point of each of the plurality of sub-curved paths matches an orientation of a straight line, and the straight line connects the end point of each of the plurality of sub-curved paths and the estimated position.

7. The information processing apparatus according to claim 1, wherein the CPU is further configured to:
   determine that an orientation of the mobile apparatus and a moving direction of the mobile apparatus are linked; and
   determine, based on the determination that the orientation of the mobile apparatus and the moving direction of the mobile apparatus are linked, a Bezier curve as the path.

8. The information processing apparatus according to claim 7, wherein
   the CPU is further configured to determine the speed of the mobile apparatus further based on a difference between an orientation of an end point of each of a plurality of sub-curved paths and an orientation of a tangent line of the end point of each of the plurality of sub-curved paths, and
   the mobile apparatus moves on the plurality of sub-curved paths.

9. The information processing apparatus according to claim 8, wherein
   the CPU is further configured to increase the determined speed of the mobile apparatus further based on an increase in the difference between the orientation of the end point of each of the plurality of sub-curved paths and the orientation of the tangent line of the end point of each of the plurality of sub-curved paths.

10. An information processing method, comprising:
   detecting an object from an image captured by a mobile apparatus, wherein the mobile apparatus is configured to follow the object;
   determining, based on the detection of the object, a speed of the mobile apparatus to follow the object;
   increasing the determined speed of the mobile apparatus based on a time length, wherein the object is lost for the time length;
   determining an orientation of the object based on the detection of the object;
   determining an orientation of a path end point based on the determined orientation of the object;
   generating, based on the determined orientation of the path end point, a path for the mobile apparatus to follow the object, wherein the path end point is an end point of the generated path; and
   controlling, based on the increased speed and the generated path, a moving mechanism of the mobile apparatus to move on the generated path.

11. A non-transitory computer-readable medium having stored thereon, computer-executable instructions which, when executed by a central processing unit (CPU), cause the CPU to execute operations, the operations comprising:
   detecting an object from an image captured by a mobile apparatus, wherein the mobile apparatus is configured to follow the object;
   determining, based on the detection of the object, a speed of the mobile apparatus to follow the object;
   increasing the determined speed of the mobile apparatus based on a time length, wherein the object is lost for the time length;
   determining an orientation of the object based on the detection of the object;
   determining an orientation of a path end point based on the determined orientation of the object;
   generating, based on the determined orientation of the path end point, a path for the mobile apparatus to follow the object, wherein the path end point is an end point of the generated path; and
   controlling, based on the increased speed and the generated path, a moving mechanism of the mobile apparatus to move on the generated path.

12. A mobile apparatus, comprising:
   a moving mechanism;
   an image sensor configured to capture an image; and
   a central processing unit (CPU) configured to:
      detect an object from the captured image, wherein the mobile apparatus is configured to follow the object;
      determine, based on the detection of the object, a speed of the mobile apparatus to follow the object;
      increase the determined speed of the mobile apparatus based on a time length, wherein the object is lost for the time length;
      determine an orientation of the object based on the detection of the object;
      determine an orientation of a path end point based on the determined orientation of the object;
      generate, based on the determined orientation of the path end point, a path for the mobile apparatus to follow the object, wherein the path end point is an end point of the generated path; and
      control the moving mechanism based on the increased speed and the generated path to move on the generated path.

\* \* \* \* \*